United States Patent
Vaish et al.

(10) Patent No.: US 12,449,891 B2
(45) Date of Patent: Oct. 21, 2025

(54) TIMELAPSE RE-EXPERIENCING SYSTEM

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 362 days.

(21) Appl. No.: 17/900,354

(22) Filed: Aug. 31, 2022

(65) Prior Publication Data

US 2024/0069626 A1     Feb. 29, 2024

(51) Int. Cl.
G06F 3/01     (2006.01)
G06T 19/00    (2011.01)

(52) U.S. Cl.
CPC ............ G06F 3/011 (2013.01); G06T 19/003 (2013.01)

(58) Field of Classification Search
CPC ... G06F 3/011; G06F 2203/011; G06T 19/003
See application file for complete search history.

(56) References Cited

U.S. PATENT DOCUMENTS

| | | |
|---|---|---|
| 4,807,158 A | 2/1989 | Blanton et al. |
| 6,038,295 A | 3/2000 | Mattes |
| 6,430,997 B1 | 8/2002 | French et al. |
| 6,819,982 B2 | 11/2004 | Doane |
| 6,980,909 B2 | 12/2005 | Root et al. |
| 7,173,651 B1 | 2/2007 | Knowles |
| 7,190,496 B2 | 3/2007 | Klug et al. |
| 7,411,493 B2 | 8/2008 | Smith |
| 7,535,890 B2 | 5/2009 | Rojas |
| 7,542,073 B2 | 6/2009 | Li et al. |
| 8,046,719 B2 | 10/2011 | Skourup et al. |
| 8,131,597 B2 | 3/2012 | Hudetz |
| 8,174,562 B2 | 5/2012 | Hartman |

(Continued)

FOREIGN PATENT DOCUMENTS

| | | |
|---|---|---|
| CA | 2887596 | 7/2015 |
| CN | 105912129 A | 8/2016 |

(Continued)

OTHER PUBLICATIONS

US 10,656,660 B1, 05/2020, Meisenholder et al. (withdrawn)

(Continued)

*Primary Examiner* — Abderrahim Merouan
(74) *Attorney, Agent, or Firm* — Schwegman Lundberg & Woessner, P.A.

(57) ABSTRACT

A system captures via one or more sensors of a computing device, data of an environment observed by the one or more sensors at a first timeslot, and stores the data in a data store as a first portion of a timelapse memory experience. The system also captures, via the one or more sensors of a computing device, data of the environment observed by the one or more sensors at a second timeslot, and stores the data in a data store as a second portion of the timelapse memory experience. The system additionally associates the timelapse memory experience with a memory experience trigger, wherein the memory experience trigger can initiate a presentation of the timelapse memory experience.

20 Claims, 11 Drawing Sheets

(56) References Cited

U.S. PATENT DOCUMENTS

| | | |
|---|---|---|
| 8,199,747 B2 | 6/2012 | Rojas et al. |
| 8,274,550 B2 | 9/2012 | Steuart, III |
| 8,332,475 B2 | 12/2012 | Rosen et al. |
| 8,608,563 B2 | 12/2013 | Miyazaki et al. |
| 8,646,720 B2 | 2/2014 | Shaw |
| 8,718,333 B2 | 5/2014 | Wolf et al. |
| 8,724,622 B2 | 5/2014 | Rojas |
| 8,812,954 B2 | 8/2014 | Shuster et al. |
| 8,874,677 B2 | 10/2014 | Rosen et al. |
| 8,909,679 B2 | 12/2014 | Root et al. |
| 8,934,015 B1 | 1/2015 | Chi et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,186,548 B2 | 11/2015 | House et al. |
| 9,191,776 B2 | 11/2015 | Root et al. |
| 9,204,252 B2 | 12/2015 | Root |
| 9,235,932 B2 | 1/2016 | Choi et al. |
| 9,344,642 B2 | 5/2016 | Niemi et al. |
| 9,345,711 B2 | 5/2016 | Friedhoff |
| 9,443,227 B2 | 9/2016 | Evans et al. |
| 9,445,081 B1 | 9/2016 | Kouperman et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,551,873 B2 | 1/2017 | Zalewski |
| 9,576,369 B2 | 2/2017 | Venkataraman et al. |
| 9,582,166 B2 | 2/2017 | Vaittinen et al. |
| 9,586,147 B2 | 3/2017 | Bathiche et al. |
| 9,589,448 B1 | 3/2017 | Schneider et al. |
| 9,681,046 B2 | 6/2017 | Adsumilli et al. |
| 9,703,369 B1 | 7/2017 | Mullen |
| 9,723,272 B2 | 8/2017 | Lu et al. |
| 9,747,901 B1 | 8/2017 | Gentry |
| 9,761,057 B2 | 9/2017 | Salter et al. |
| 9,779,538 B2 | 10/2017 | Sanders et al. |
| 9,794,527 B1 | 10/2017 | Balez et al. |
| 9,818,225 B2 | 11/2017 | Wang et al. |
| 9,916,673 B2 | 3/2018 | Castro et al. |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,282,903 B1 | 5/2019 | Clark et al. |
| 10,289,193 B2 | 5/2019 | Hardy et al. |
| 10,313,481 B2 | 6/2019 | Kada |
| 10,325,410 B1 | 6/2019 | Smith et al. |
| 10,365,784 B2 | 7/2019 | Inomata |
| 10,370,118 B1 | 8/2019 | Nielsen et al. |
| 10,403,050 B1 | 9/2019 | Beall et al. |
| 10,445,925 B2 | 10/2019 | Tokubo |
| 10,445,940 B2 | 10/2019 | Guay et al. |
| 10,482,665 B2 | 11/2019 | Copic et al. |
| 10,501,180 B2 | 12/2019 | Yu |
| 10,504,277 B1 | 12/2019 | Haitani et al. |
| 10,581,940 B1 | 3/2020 | Iyer et al. |
| 10,599,286 B2 | 3/2020 | Inomata |
| 10,616,663 B2 | 4/2020 | Davisson et al. |
| 10,768,639 B1 | 9/2020 | Meisenholder et al. |
| 10,768,776 B1 | 9/2020 | Roche et al. |
| 10,796,489 B1 | 10/2020 | Cordes et al. |
| 10,819,946 B1 | 10/2020 | Tanumihardja et al. |
| 10,901,215 B1 | 1/2021 | Newcombe et al. |
| 10,921,878 B2 | 2/2021 | Noris et al. |
| 10,937,239 B2 | 3/2021 | Huston et al. |
| 11,006,095 B2 | 5/2021 | Holzer et al. |
| 11,051,049 B2 | 6/2021 | Bustamante et al. |
| 11,062,517 B2 | 7/2021 | Crews et al. |
| 11,094,127 B2 * | 8/2021 | McCall .................. G06V 20/64 |
| 11,126,206 B2 | 9/2021 | Meisenholder et al. |
| 11,145,123 B1 | 10/2021 | Chor et al. |
| 11,156,830 B2 | 10/2021 | Johnson et al. |
| 11,163,358 B2 | 11/2021 | Marks et al. |
| 11,194,439 B2 | 12/2021 | Laaksonen et al. |
| 11,200,028 B2 | 12/2021 | Newell et al. |
| 11,200,742 B1 | 12/2021 | Post et al. |
| 11,302,077 B2 | 4/2022 | Kang et al. |
| 11,361,473 B1 | 6/2022 | Abdollahian et al. |
| 11,372,474 B2 | 6/2022 | Schweet et al. |
| 11,413,514 B2 | 8/2022 | Marty et al. |
| 11,436,806 B1 | 9/2022 | Katz |
| 11,468,605 B2 | 10/2022 | Corson |
| 11,481,423 B1 | 10/2022 | Singleton |
| 11,481,980 B2 | 10/2022 | Yerli |
| 11,495,004 B1 | 11/2022 | Henry |
| 11,521,359 B2 | 12/2022 | Noorkami et al. |
| 11,623,138 B2 | 4/2023 | Yeh et al. |
| 11,734,905 B1 | 8/2023 | Henry |
| 11,769,299 B1 | 9/2023 | Stehlik et al. |
| 11,810,259 B2 | 11/2023 | Ramani et al. |
| 11,847,749 B2 | 12/2023 | Lebeaupin et al. |
| 11,941,764 B2 | 3/2024 | Harding et al. |
| 11,972,521 B2 | 4/2024 | Vaish et al. |
| 12,267,482 B2 | 4/2025 | Vaish et al. |
| 12,282,604 B2 | 4/2025 | Vaish et al. |
| 12,322,052 B2 | 6/2025 | Kratz et al. |
| 2004/0135890 A1 | 7/2004 | Kaneko et al. |
| 2006/0287025 A1 | 12/2006 | French |
| 2007/0167689 A1 | 7/2007 | Ramadas et al. |
| 2007/0250526 A1 | 10/2007 | Hanna |
| 2008/0081676 A1 | 4/2008 | Chakraborty et al. |
| 2008/0158256 A1 | 7/2008 | Russell et al. |
| 2008/0168411 A1 | 7/2008 | Mang et al. |
| 2008/0186255 A1 | 8/2008 | Cohen et al. |
| 2008/0211771 A1 | 9/2008 | Richardson |
| 2008/0255842 A1 | 10/2008 | Simhi |
| 2009/0122133 A1 | 5/2009 | Hartman |
| 2009/0171902 A1 | 7/2009 | Maclaurin et al. |
| 2009/0187389 A1 | 7/2009 | Dobbins et al. |
| 2009/0213114 A1 | 8/2009 | Dobbins et al. |
| 2010/0026809 A1 | 2/2010 | Curry |
| 2010/0125799 A1 | 5/2010 | Roberts et al. |
| 2010/0185984 A1 | 7/2010 | Wright et al. |
| 2010/0260422 A1 | 10/2010 | Ito et al. |
| 2011/0179313 A1 | 7/2011 | Macdonald et al. |
| 2011/0202598 A1 | 8/2011 | Evans et al. |
| 2011/0214082 A1 | 9/2011 | Osterhout et al. |
| 2011/0242134 A1 | 10/2011 | Miller et al. |
| 2011/0261083 A1 | 10/2011 | Wilson |
| 2012/0027278 A1 | 2/2012 | Chaney et al. |
| 2012/0052947 A1 | 3/2012 | Yun |
| 2012/0131125 A1 * | 5/2012 | Seidel .................. H04N 5/76 |
| | | 709/212 |
| 2012/0188452 A1 | 7/2012 | Keiser et al. |
| 2012/0194420 A1 | 8/2012 | Osterhout et al. |
| 2012/0209924 A1 | 8/2012 | Evans et al. |
| 2012/0263154 A1 | 10/2012 | Blanchflower et al. |
| 2012/0281885 A1 | 11/2012 | Syrdal et al. |
| 2012/0287274 A1 | 11/2012 | Bevirt |
| 2012/0320169 A1 | 12/2012 | Bathiche |
| 2013/0056581 A1 | 3/2013 | Sparks |
| 2013/0072296 A1 | 3/2013 | Miyazaki et al. |
| 2013/0083009 A1 | 4/2013 | Geisner et al. |
| 2013/0083173 A1 | 4/2013 | Geisner et al. |
| 2013/0162632 A1 | 6/2013 | Varga et al. |
| 2013/0238168 A1 | 9/2013 | Reyes |
| 2014/0013228 A1 | 1/2014 | Hutten |
| 2014/0038708 A1 | 2/2014 | Davison et al. |
| 2014/0254896 A1 | 9/2014 | Zhou et al. |
| 2014/0285522 A1 | 9/2014 | Kim et al. |
| 2014/0357366 A1 | 12/2014 | Koganezawa et al. |
| 2014/0368542 A1 | 12/2014 | Tawara et al. |
| 2015/0015486 A1 | 1/2015 | Osman et al. |
| 2015/0015608 A1 | 1/2015 | Park |
| 2015/0016777 A1 | 1/2015 | Abovitz et al. |
| 2015/0022432 A1 | 1/2015 | Stewart et al. |
| 2015/0035862 A1 | 2/2015 | Fischer et al. |
| 2015/0070272 A1 | 3/2015 | Kim et al. |
| 2015/0175263 A1 | 6/2015 | Reyes |

(56) References Cited

U.S. PATENT DOCUMENTS

| | | |
|---|---|---|
| 2015/0193979 A1 | 7/2015 | Grek |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0355711 A1 | 12/2015 | Rihn |
| 2015/0362917 A1 | 12/2015 | Wang et al. |
| 2015/0363034 A1 | 12/2015 | Hinckley et al. |
| 2016/0004390 A1 | 1/2016 | Laska et al. |
| 2016/0027218 A1 | 1/2016 | Salter et al. |
| 2016/0049003 A1* | 2/2016 | Shuster ............... A63F 13/355 386/230 |
| 2016/0063987 A1 | 3/2016 | Xu et al. |
| 2016/0071548 A1 | 3/2016 | House et al. |
| 2016/0133230 A1 | 5/2016 | Daniels et al. |
| 2016/0161946 A1 | 6/2016 | Wuth Sepulveda et al. |
| 2016/0179096 A1 | 6/2016 | Bradlow et al. |
| 2016/0217623 A1 | 7/2016 | Singh |
| 2016/0292575 A1 | 10/2016 | Weast et al. |
| 2016/0292886 A1 | 10/2016 | Erad et al. |
| 2016/0307335 A1 | 10/2016 | Perry et al. |
| 2016/0307573 A1 | 10/2016 | Wobrock |
| 2016/0330532 A1 | 11/2016 | Bostick et al. |
| 2016/0336020 A1 | 11/2016 | Bradlow et al. |
| 2016/0350973 A1 | 12/2016 | Shapira et al. |
| 2016/0357258 A1 | 12/2016 | Yeom et al. |
| 2017/0031369 A1 | 2/2017 | Liu et al. |
| 2017/0061700 A1 | 3/2017 | Urbach et al. |
| 2017/0084051 A1 | 3/2017 | Weising et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0208103 A1 | 7/2017 | Sarmova |
| 2017/0225796 A1 | 8/2017 | Sun et al. |
| 2017/0228690 A1 | 8/2017 | Kohli |
| 2017/0237940 A1 | 8/2017 | Chaney et al. |
| 2017/0244937 A1 | 8/2017 | Meier et al. |
| 2017/0256040 A1 | 9/2017 | Grauer |
| 2017/0266554 A1 | 9/2017 | Marks et al. |
| 2017/0269685 A1 | 9/2017 | Marks et al. |
| 2017/0320564 A1 | 11/2017 | Kuzikov |
| 2017/0323481 A1 | 11/2017 | Tran et al. |
| 2017/0324841 A1 | 11/2017 | Clement et al. |
| 2017/0337791 A1 | 11/2017 | Gordon-Carroll |
| 2017/0359624 A1 | 12/2017 | Englert et al. |
| 2017/0364153 A1 | 12/2017 | Kazansky et al. |
| 2017/0365098 A1 | 12/2017 | Auten et al. |
| 2017/0365102 A1 | 12/2017 | Huston et al. |
| 2017/0371353 A1 | 12/2017 | Millinger, III |
| 2018/0005429 A1 | 1/2018 | Osman et al. |
| 2018/0059783 A1 | 3/2018 | Van Hoff et al. |
| 2018/0082682 A1 | 3/2018 | Erickson et al. |
| 2018/0098059 A1 | 4/2018 | Valdivia et al. |
| 2018/0130257 A1 | 5/2018 | Moran |
| 2018/0154232 A1 | 6/2018 | Gentil |
| 2018/0190033 A1 | 7/2018 | Barnett et al. |
| 2018/0246529 A1 | 8/2018 | Hu et al. |
| 2018/0270427 A1 | 9/2018 | Damstra et al. |
| 2018/0288364 A1 | 10/2018 | Virhia |
| 2018/0311585 A1 | 11/2018 | Osman |
| 2018/0329486 A1 | 11/2018 | Williams et al. |
| 2019/0005546 A1 | 1/2019 | Chen et al. |
| 2019/0005728 A1 | 1/2019 | Leppanen et al. |
| 2019/0011921 A1 | 1/2019 | Wang et al. |
| 2019/0054379 A1 | 2/2019 | Ackley et al. |
| 2019/0073831 A1 | 3/2019 | Kim |
| 2019/0073832 A1 | 3/2019 | Kim |
| 2019/0130599 A1 | 5/2019 | Gebbie et al. |
| 2019/0130631 A1 | 5/2019 | Gebbie et al. |
| 2019/0138260 A1 | 5/2019 | Rogers et al. |
| 2019/0172265 A1 | 6/2019 | Cossairt et al. |
| 2019/0180509 A1 | 6/2019 | Laaksonen et al. |
| 2019/0182471 A1 | 6/2019 | Khalid et al. |
| 2019/0188895 A1 | 6/2019 | Miller, IV et al. |
| 2019/0199993 A1 | 6/2019 | Babu J D et al. |
| 2019/0208189 A1 | 7/2019 | Lau et al. |
| 2019/0217189 A1 | 7/2019 | Gutierrez et al. |
| 2019/0278369 A1 | 9/2019 | Ballard |
| 2019/0325654 A1 | 10/2019 | Stisser et al. |
| 2019/0358547 A1 | 11/2019 | Mack et al. |
| 2020/0020136 A1 | 1/2020 | Hwang et al. |
| 2020/0042160 A1 | 2/2020 | Gabbi et al. |
| 2020/0043235 A1 | 2/2020 | Chapman et al. |
| 2020/0051336 A1 | 2/2020 | Ichikawa et al. |
| 2020/0066043 A1 | 2/2020 | Graham et al. |
| 2020/0097077 A1 | 3/2020 | Nguyen et al. |
| 2020/0098179 A1 | 3/2020 | Gough et al. |
| 2020/0098191 A1 | 3/2020 | Mccall |
| 2020/0101372 A1 | 4/2020 | Drake et al. |
| 2020/0126257 A1 | 4/2020 | Tauber |
| 2020/0134911 A1 | 4/2020 | Van Hoff et al. |
| 2020/0159361 A1 | 5/2020 | Rosenberg et al. |
| 2020/0162779 A1* | 5/2020 | Saxena ............... H04N 21/4516 |
| 2020/0169715 A1 | 5/2020 | Liu et al. |
| 2020/0171394 A1 | 6/2020 | Khan et al. |
| 2020/0241575 A1 | 7/2020 | Meisenholder et al. |
| 2020/0242840 A1 | 7/2020 | Logan et al. |
| 2020/0257367 A1 | 8/2020 | Rihn et al. |
| 2020/0260149 A1 | 8/2020 | Ding et al. |
| 2020/0273243 A1 | 8/2020 | Duffy et al. |
| 2020/0279407 A1 | 9/2020 | Liljeroos et al. |
| 2020/0289935 A1 | 9/2020 | Azmandian et al. |
| 2020/0289941 A1 | 9/2020 | Khan et al. |
| 2020/0314323 A1 | 10/2020 | Van Geel et al. |
| 2020/0341541 A1 | 10/2020 | Olah-Reiken et al. |
| 2020/0349751 A1 | 11/2020 | Bentovim et al. |
| 2020/0371737 A1 | 11/2020 | Leppänen et al. |
| 2020/0394012 A1 | 12/2020 | Wright, Jr. et al. |
| 2020/0409451 A1 | 12/2020 | Mukherjea et al. |
| 2021/0096543 A1 | 4/2021 | Stump et al. |
| 2021/0142578 A1 | 5/2021 | Weinheimer et al. |
| 2021/0159980 A1 | 5/2021 | Ben-Yehuda et al. |
| 2021/0232632 A1 | 7/2021 | Howard |
| 2021/0272367 A1 | 9/2021 | Richter |
| 2021/0279962 A1 | 9/2021 | Hutten et al. |
| 2021/0286179 A1 | 9/2021 | Miller, IV et al. |
| 2021/0287452 A1 | 9/2021 | Maruyama |
| 2021/0289317 A1 | 9/2021 | Son et al. |
| 2021/0312684 A1 | 10/2021 | Zimmermann et al. |
| 2021/0327145 A1* | 10/2021 | Noorkami ............... G06T 17/20 |
| 2021/0362848 A1 | 11/2021 | Spencer |
| 2021/0374579 A1 | 12/2021 | Dotan-cohen et al. |
| 2021/0382503 A1 | 12/2021 | Meisenholder et al. |
| 2021/0390953 A1 | 12/2021 | Makker et al. |
| 2021/0394046 A1* | 12/2021 | Yen .................... G06V 20/20 |
| 2021/0405772 A1 | 12/2021 | Canberk et al. |
| 2021/0407178 A1 | 12/2021 | Zhou et al. |
| 2021/0407208 A1 | 12/2021 | Hariton |
| 2021/0409502 A1* | 12/2021 | Chepizhenko ......... G06Q 30/02 |
| 2022/0014723 A1 | 1/2022 | Pandey et al. |
| 2022/0028108 A1 | 1/2022 | Haapoja et al. |
| 2022/0028170 A1 | 1/2022 | Haapoja et al. |
| 2022/0053219 A1 | 2/2022 | Bathory |
| 2022/0101593 A1 | 3/2022 | Rockel et al. |
| 2022/0103969 A1 | 3/2022 | Drummond et al. |
| 2022/0108539 A1 | 4/2022 | Nussbaum et al. |
| 2022/0116581 A1 | 4/2022 | Miyata et al. |
| 2022/0124143 A1 | 4/2022 | Rafkind et al. |
| 2022/0139055 A1 | 5/2022 | Palmaro |
| 2022/0146833 A1 | 5/2022 | Miller, IV et al. |
| 2022/0164491 A1 | 5/2022 | Palmaro |
| 2022/0189075 A1 | 6/2022 | Lynch et al. |
| 2022/0197485 A1 | 6/2022 | Goodrich et al. |
| 2022/0198603 A1 | 6/2022 | Goodrich et al. |
| 2022/0230663 A1 | 7/2022 | Sun et al. |
| 2022/0242450 A1 | 8/2022 | Sokolov et al. |
| 2022/0244835 A1 | 8/2022 | Faulkner et al. |
| 2022/0247929 A1 | 8/2022 | Yang et al. |
| 2022/0269336 A1 | 8/2022 | Lafontaine et al. |
| 2022/0274026 A1 | 9/2022 | Steigelfest et al. |
| 2022/0362631 A1 | 11/2022 | Hong |
| 2022/0382255 A1 | 12/2022 | Lee |
| 2023/0010754 A1* | 1/2023 | Saxena ............ H04N 21/43079 |
| 2023/0063505 A1 | 3/2023 | Chastain et al. |

(56) References Cited

U.S. PATENT DOCUMENTS

| | | |
|---|---|---|
| 2023/0097571 A1 | 3/2023 | Mccain et al. |
| 2023/0139337 A1 | 5/2023 | Noam et al. |
| 2023/0173367 A1 | 6/2023 | Marty et al. |
| 2023/0179641 A1 | 6/2023 | Bauer et al. |
| 2023/0214005 A1 | 7/2023 | Ohashi |
| 2023/0214082 A1 | 7/2023 | Kang |
| 2023/0237192 A1 | 7/2023 | Kahan et al. |
| 2023/0316681 A1 | 10/2023 | Dolev et al. |
| 2023/0334754 A1 | 10/2023 | Kirchmayer et al. |
| 2023/0341928 A1 | 10/2023 | Traynor et al. |
| 2023/0342989 A1 | 10/2023 | Lehtiniemi et al. |
| 2023/0409114 A1 | 12/2023 | Sun et al. |
| 2023/0412480 A1 | 12/2023 | Greyson et al. |
| 2024/0005623 A1 | 1/2024 | Cooper et al. |
| 2024/0069626 A1* | 2/2024 | Vaish ............ G06T 19/003 |
| 2024/0069627 A1 | 2/2024 | Vaish et al. |
| 2024/0069637 A1 | 2/2024 | Vaish et al. |
| 2024/0070969 A1 | 2/2024 | Vaish et al. |
| 2024/0071004 A1 | 2/2024 | Vaish et al. |
| 2024/0071006 A1 | 2/2024 | Kratz et al. |
| 2024/0071007 A1 | 2/2024 | Vaish et al. |
| 2024/0071008 A1 | 2/2024 | Vaish et al. |
| 2024/0073402 A1 | 2/2024 | Vaish et al. |
| 2024/0073404 A1 | 2/2024 | Vaish et al. |
| 2024/0119679 A1 | 4/2024 | Canberk et al. |
| 2024/0119682 A1 | 4/2024 | Rudman et al. |
| 2024/0233224 A1 | 7/2024 | Fan et al. |
| 2024/0273832 A1 | 8/2024 | Newman et al. |
| 2025/0184471 A1 | 6/2025 | Vaish et al. |

FOREIGN PATENT DOCUMENTS

| | | |
|---|---|---|
| CN | 119790367 | 4/2025 |
| JP | 2010061452 A | 3/2010 |
| KR | 20200014587 A | 2/2020 |
| KR | 20200109812 A | 9/2020 |
| KR | 20210065423 A | 6/2021 |
| KR | 20210135859 A | 11/2021 |
| KR | 20220064130 A | 5/2022 |
| WO | WO-2016105839 A1 | 6/2016 |
| WO | WO-2021002788 A1 | 1/2021 |
| WO | 2024050232 | 3/2024 |
| WO | WO-2024049687 A1 | 3/2024 |
| WO | WO-2024049700 A1 | 3/2024 |
| WO | WO-2024050229 A1 | 3/2024 |
| WO | WO-2024050231 A1 | 3/2024 |
| WO | WO-2024050245 A1 | 3/2024 |
| WO | WO-2024050246 A1 | 3/2024 |
| WO | WO-2024050259 A1 | 3/2024 |
| WO | WO-2024050262 A1 | 3/2024 |
| WO | WO-2024050264 A1 | 3/2024 |

OTHER PUBLICATIONS

"International Application Serial No. PCT US2023 072282, International Search Report mailed Dec. 1, 2023", 4 pgs.

"International Application Serial No. PCT US2023 072282, Written Opinion mailed Dec. 1, 2023", 4 pgs.

Laput, Gierad, "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: URL: http: www.theregister.co.uk 2005 12 12 stealthtext, (Dec. 12, 2005), 1 pg.

Meisenholder, David, "Remoteless Control of Drone Behavior", U.S. Appl. No. 15/640,143, filed Jun. 30, 2017, 108 pgs.

Pourmehr, Shokoofeh, "You two! Take off!': Creating, Modifying, and Commanding Groups of Robots Using Face Engagement and Indirect Speech in Voice Commands", IEEE RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

"U.S. Appl. No. 17/899,935, Non Final Office Action mailed Jun. 6, 2024", 13 pgs.

"U.S. Appl. No. 17/899,935, Response filed Oct. 7, 2024 to Non Final Office Action mailed Jun. 6, 2024", 11 pgs.

"U.S. Appl. No. 17/899,970, Corrected Notice of Allowability mailed Jan. 3, 2024", 5 pgs.

"U.S. Appl. No. 17/899,970, Non Final Office Action mailed Jul. 3, 2023", 22 pgs.

"U.S. Appl. No. 17/899,970, Notice of Allowance mailed Dec. 20, 2023", 9 pgs.

"U.S. Appl. No. 17/899,970, PTO Response to Rule 312 Communication mailed Ma. 27, 2024", 1 page.

"U.S. Appl. No. 17/899,970, Response filed Oct. 3, 2023 to Non Final Office Action mailed Jul. 3, 2023", 11 pgs.

"U.S. Appl. No. 17/899,970, Supplemental Notice of Allowability mailed Mar. 27, 2024", 2 pgs.

"U.S. Appl. No. 17/900,200, Final Office Action mailed May 6, 2024", 32 pgs.

"U.S. Appl. No. 17/900,200, Non Final Office Action mailed Aug. 29, 2024", 35 pgs.

"U.S. Appl. No. 17/900,200, Non Final Office Action mailed Nov. 8, 2023", 26 pgs.

"U.S. Appl. No. 17/900,200, Response filed Jan. 31, 2024 to Non Final Office Action mailed Nov. 8, 2023", 14 pgs.

"U.S. Appl. No. 17/900,200, Response filed Aug. 6, 2024 to Final Office Action mailed May 6, 2024", 13 pgs.

"U.S. Appl. No. 17/900,407, Advisory Action mailed Oct. 30, 2024", 3 pgs.

"U.S. Appl. No. 17/900,407, Examiner Interview Summary mailed Apr. 15, 2024", 2 pgs.

"U.S. Appl. No. 17/900,407, Final Office Action mailed Aug. 21, 2024", 14 pgs.

"U.S. Appl. No. 17/900,407, Non Final Office Action mailed Feb. 9, 2024", 11 pgs.

"U.S. Appl. No. 17/900,407, Response filed Apr. 23, 2024 to Non Final Office Action mailed Feb. 9, 2024", 12 pgs.

"U.S. Appl. No. 17/900,407, Response filed Oct. 18, 2024 to Final Office Action mailed Aug. 21, 2024", 12 pgs.

"U.S. Appl. No. 17/900,436, Non Final Office Action mailed Sep. 23, 2024", 12 pgs.

"U.S. Appl. No. 18/056,142, Corrected Notice of Allowability mailed Sep. 4, 2024", 2 pgs.

"U.S. Appl. No. 18/056,142, Examiner Interview Summary mailed Nov. 7, 2023", 2 pgs.

"U.S. Appl. No. 18/056,142, Final Office Action mailed Apr. 8, 2024", 15 pgs.

"U.S. Appl. No. 18/056,142, Non Final Office Action mailed Aug. 7, 2023", 12 pgs.

"U.S. Appl. No. 18/056,142, Notice of Allowance mailed Aug. 16, 2024", 9 pgs.

"U.S. Appl. No. 18/056,142, Notice of Non-Compliant Amendment mailed Nov. 16, 2023", 2 pgs.

"U.S. Appl. No. 18/056,142, Response filed Jan. 3, 2024 to Notice of Non-Compliant Amendment mailed Nov. 16, 2023", 11 pgs.

"U.S. Appl. No. 18/056,142, Response filed Jul. 8, 2024 to Final Office Action mailed Apr. 8, 2024", 13 pgs.

"U.S. Appl. No. 18/056,142, Response filed Nov. 7, 2023 to Non Final Office Action mailed Aug. 7, 2023", 11 pgs.

"U.S. Appl. No. 18/058,175, Examiner Interview Summary mailed Jun. 7, 2024", 2 pgs.

"U.S. Appl. No. 18/058,175, Final Office Action mailed Sep. 19, 2024", 12 pgs.

"U.S. Appl. No. 18/058,175, Non Final Office Action mailed Mar. 11, 2024", 14 pgs.

"U.S. Appl. No. 18/058,175, Notice of Allowance mailed Nov. 15, 2024", 8 pgs.

"U.S. Appl. No. 18/058,175, Response filed Jun. 11, 2024 to Non Final Office Action mailed Mar. 11, 2024", 11 pgs.

"U.S. Appl. No. 18/058,175, Response filed Oct. 30, 2024 to Final Office Action mailed Sep. 19, 2024", 9 pgs.

(56) References Cited

OTHER PUBLICATIONS

"U.S. Appl. No. 18/169,631, Non Final Office Action mailed Sep. 17, 2024", 28 pgs.
"U.S. Appl. No. 17/899,970, 312 Amendment filed Mar. 20, 2024", 7 pgs.
"International Application Serial No. PCT/US2023/030926, International Search Report mailed Dec. 12, 2023", 3 pgs.
"International Application Serial No. PCT/US2023/030926, Written Opinion mailed Dec. 12, 2023", 4 pgs.
"International Application Serial No. PCT/US2023/031066, International Search Report mailed Dec. 15, 2023", 3 pgs.
"International Application Serial No. PCT/US2023/031066, Written Opinion mailed Dec. 15, 2023", 3 pgs.
"International Application Serial No. PCT/US2023/072274, International Search Report mailed Nov. 28, 2023", 3 pgs.
"International Application Serial No. PCT/US2023/072274, Written Opinion mailed Nov. 28, 2023", 4 pgs.
"International Application Serial No. PCT/US2023/072277, International Search Report mailed Dec. 8, 2023", 4 pgs.
"International Application Serial No. PCT/US2023/072277, Written Opinion mailed Dec. 8, 2023", 4 pgs.
"International Application Serial No. PCT/US2023/072557, International Search Report mailed Dec. 12, 2023", 3 pgs.
"International Application Serial No. PCT/US2023/072557, Written Opinion mailed Dec. 12, 2023", 4 pgs.
"International Application Serial No. PCT/US2023/072568, International Search Report mailed Dec. 5, 2023", 3 pgs.
"International Application Serial No. PCT/US2023/072568, Written Opinion mailed Dec. 5, 2023", 4 pgs.
"International Application Serial No. PCT/US2023/072701, International Search Report mailed Dec. 1, 2023", 3 pgs.
"International Application Serial No. PCT/US2023/072701, Written Opinion mailed Dec. 1, 2023", 4 pgs.
"International Application Serial No. PCT/US2023/072718, International Search Report mailed Dec. 1, 2023", 3 pgs.
"International Application Serial No. PCT/US2023/072718, Written Opinion mailed Dec. 1, 2023", 4 pgs.
"International Application Serial No. PCT/US2023/072726, International Search Report mailed Dec. 12, 2023", 3 pgs.
"International Application Serial No. PCT/US2023/072726, Written Opinion mailed Dec. 12, 2023", 4 pgs.
Ko, Jonggook, et al., "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.
Langa, Sergi Fernandez, et al., "Multiparty Holomeetings Toward a New Era of Low Cost Volumetric Holographic Meetings in Virtual Reality", IEEE Access vol. 10, (Aug. 3, 2022), 21 pgs.
S. A., Aseeri, et al., "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.
Yanbin, Wang, et al., "Real Time Stereoscopic Rendering of Realistic Avatar for Interactive 3D Telepresence System", 2nd International Conference on Image Vision and Computing ICIVC Chengdu, (2017), 5 pgs.
U.S. Appl. No. 17/900,200, filed Aug. 31, 2022, Multi-Perspective Augmented Reality Experience.
U.S. Appl. No. 17/900,407, filed Aug. 31, 2022, Controlling and Editing Presentation of Volumetric Content.
U.S. Appl. No. 17/900,436, filed Aug. 31, 2022, Contectual Memory Experience Triggers System.
U.S. Appl. No. 17/899,970, U.S. Pat. No. 11,972,521, filed Aug. 31, 2022, Multisensorial Presentation of Volumetric Content.
U.S. Appl. No. 18/056,142, filed Nov. 16, 2022, Touch-Based Augmented Reality Experience.
U.S. Appl. No. 18/058,175, filed Nov. 22, 2022, Mixing and Matching Volumetric Contents for New Augmented Reality Experiences.
U.S. Appl. No. 17/899,935, filed Aug. 31, 2022, Social Memory Re-Experiencing System.
U.S. Appl. No. 18/170,271, filed Feb. 16, 2023, Generating Immersive Augmented Reality Experiences from Existing Images and Videos.
U.S. Appl. No. 18/169,631, filed Feb. 15, 2023, Multi-Dimensional Experience Presentation Using Augmented Reality.
"U.S. Appl. No. 17/899,935, Final Office Action mailed Jan. 10, 2025", 13 pgs.
"U.S. Appl. No. 17/900,200, Final Office Action mailed Mar. 3, 2025", 39 pgs.
"U.S. Appl. No. 17/900,200, Response filed Nov. 27, 2024 to Non Final Office Action mailed Aug. 29, 2024", 13 pgs.
"U.S. Appl. No. 17/900,407, Notice of Allowance mailed Nov. 27, 2024", 8 pgs.
"U.S. Appl. No. 17/900,436, Examiner Interview Summary mailed Jan. 3, 2025", 2 pgs.
"U.S. Appl. No. 17/900,436, Response filed Dec. 20, 2024 to Non Final Office Action mailed Sep. 23, 2024", 12 pgs.
"U.S. Appl. No. 18/056,142, Notice of Allowability mailed Dec. 31, 2024", 2 pgs.
"U.S. Appl. No. 18/056,142, Notice of Allowance mailed Dec. 11, 2024", 5 pgs.
"U.S. Appl. No. 18/058,175, Notice of Allowance mailed Jan. 30, 2025", 8 pgs.
"U.S. Appl. No. 18/169,631, Final Office Action mailed Mar. 10, 2025", 28 pgs.
"U.S. Appl. No. 18/169,631, Response filed Dec. 17, 2024 to Non Final Office Action mailed Sep. 17, 2024", 11 pgs.
"U.S. Appl. No. 18/170,271, Non Final Office Action mailed Nov. 29, 2024", 11 pgs.
"U.S. Appl. No. 18/170,271, Notice of Allowance mailed Feb. 4, 2025", 7 pgs.
"U.S. Appl. No. 18/170,271, Response filed Jan. 6, 2025 to Non Final Office Action mailed Nov. 29, 2024", 10 pgs.
"U.S. Appl. No. 18/056,142, Corrected Notice of Allowability mailed Mar. 12, 2025", 2 pgs.
"International Application Serial No. PCT US2023 072282, International Preliminary Report on Patentability mailed Mar. 13, 2025", 6 pgs.
"U.S. Appl. No. 18/056,142, Corrected Notice of Allowability mailed Mar. 26, 2025", 2 pgs.
"U.S. Appl. No. 17/899,935, Response filed Apr. 9, 2025 to Final Office Action mailed Jan. 10, 2025", 10 pgs.
"U.S. Appl. No. 17/900,436, Final Office Action mailed Apr. 10, 2025", 14 pgs.
"U.S. Appl. No. 17/899,935, Non Final Office Action mailed Apr. 17, 2025", 14 pgs.
"U.S. Appl. No. 18/058,175, Corrected Notice of Allowability mailed May 7, 2025", 4 pgs.
"U.S. Appl. No. 18/170,271, Notice of Allowance mailed May 9, 2025", 7 pgs.
"U.S. Appl. No. 18/169,631, Response filed Jun. 10, 2025 to Final Office Action mailed Mar. 10, 2025", 13 pgs.

* cited by examiner

TIMELAPSE RE-EXPERIENCING SYSTEM

TECHNICAL FIELD

The present disclosure generally relates to mobile and wearable computing technology. In particular, example embodiments of the present disclosure address systems, methods, and user interfaces for timelapse augmented reality and/or virtual reality memory re-experiences.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. A device that supports AR experiences in any one of these approaches is referred to herein as an "AR device." Virtual reality (VR) experiences may also be provided, in which a completely simulated or virtual view of a world is presented through a display device. The VR virtual content may also include audio content, visual content or a visual effect. A device that supports VR experiences in any one of these approaches is referred to herein as a "VR device."

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An augmented reality (AR) experience includes application of virtual content to a real-world environment whether through presentation of the virtual content by transparent displays through which a real-world environment is visible or through augmenting image data to include the virtual content overlaid on real-world environments depicted therein. The AR virtual content can comprise one or more AR content items. An AR content item may include audio content, visual content or a visual effect. A device that supports AR experiences in any one of these approaches is referred to herein as an "AR device." Virtual reality (VR) experiences may also be provided, in which a completely simulated or "virtual" view of a world is presented through a display device. The VR virtual content may also include audio content, visual content or a visual effect. A device that supports VR experiences in any one of these approaches is referred to herein as a "VR device." In some embodiments, a device, such as a smartphone, tablet, smart glasses, and so on, supports both AR and VR experiences and thus the device is both an AR device and a VR device. The AR and/or the VR devices also provide for multisensory experiences in addition to visual experiences and auditory experiences, such as haptics experiences (e.g., touch-based experiences), smell, and taste experiences.

The techniques disclosed herein capture a variety of data, including various sensor data (e.g., pictures, video, weather conditions, participants, sounds) from various moments in time to create a timelapse memory experience. In one example, the timelapse memory experience is created based on recording a target environment, such as a physical location, such as a construction site. In another example, the timelapse memory experience is created based on a recording a person. For example, a baby may be recorded as they play and grow, thus creating a timelapse memory experience at various ages. The data captured is then used, for example, for creating multisensory AR/VR timelapse memory experiences that are triggered as further describe below, to relive the original memory experience among one or more users. Such techniques enable the users to relive memories via AR and/or VR devices in a more immersive and contextual manner.

Networked Computing Environment

Figure 1:
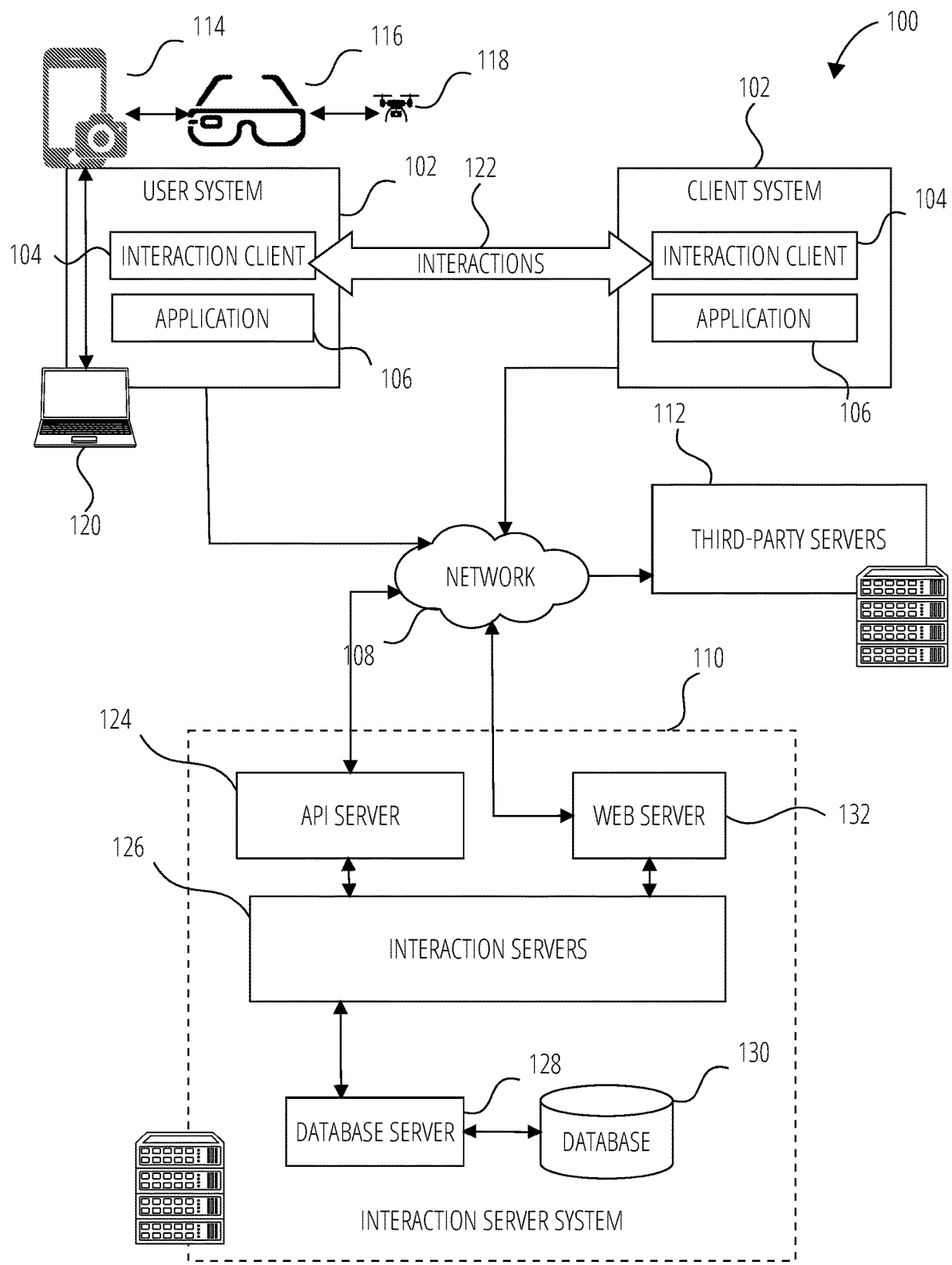
FIG. 1 is a diagrammatic representation of a networked environment in which the present disclosure may be deployed, according to some examples.

FIG. 1 is a block diagram showing an example interaction system 100 for facilitating interactions (e.g., capturing memory experiences, socially re-experiencing memory experiences, sharing memory experiences, exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, a drone 118, and a computer client device 120 that are communicatively connected to exchange data and messages. An interaction client 104 interacts with other interaction clients 104 and with the interaction server system 110 via the network 108. The data exchanged between the interaction clients 104 (e.g., interactions 122) and between the interaction clients 104 and the interaction server system 110 includes functions (e.g., commands to invoke functions) and payload data (e.g., text, audio, video, biosignals, sensor data, or other multimedia data). Biosignals refer to signals acquired from a living entity, such as a person or a pet.

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include memory experience data, timelapse data, message content, client device information, geolocation information, media augmentation and overlays, message content persistence conditions, social network information, and live event information. Data exchanges within the interaction system 100 are invoked and controlled through functions available via user interfaces (UIs) of the interaction clients 104. Augmentations include augmented reality (AR), virtual reality (VR) and mixed reality (MR) content items, overlays, image transformations, images, and modifications that may be applied to image data (e.g., videos or images).

Augmentations include volumetric content, which include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content includes displaying one or more AR content items overlaid upon a real-world space, which may be the same as the three-dimensional space in which the volumetric video was captured or a different space. The presentation of the volumetric content includes displaying one or more content items in motion, displaying one or more content items performing a movement or other action, displaying one or more content items statically positioned, or combinations thereof. A content item can be displayed for a duration of the presentation of the volumetric content or a portion thereof.

Turning now specifically to the interaction server system 110, an Application Program Interface (API) server 124 is coupled to and provides programmatic interfaces to interaction servers 126, making the functions of the interaction servers 126 accessible to interaction clients 104, other applications 106 and third-party server 112. The interaction servers 126 are communicatively coupled to a database server 128, facilitating access to a database 130 that stores data associated with interactions processed by the interaction servers 126. Similarly, a web server 132 is coupled to the interaction servers 126 and provides web-based interfaces to the interaction servers 126. To this end, the web server 132 processes incoming network requests over the Hypertext Transfer Protocol (HTTP) and several other related protocols.

The Application Program Interface (API) server 124 receives and transmits interaction data (e.g., commands and message payloads) between the interaction servers 126 and the client systems 102 (and, for example, interaction clients 104 and other application 106) and the third-party server 112. Specifically, the Application Program Interface (API) server 124 provides a set of interfaces (e.g., routines and protocols) that can be called or queried by the interaction client 104 and other applications 106 to invoke functionality of the interaction servers 126. The Application Program Interface (API) server 124 exposes various functions supported by the interaction servers 126, including account registration; login functionality; the sending of interaction data, via the interaction servers 126, from a particular interaction client 104 to another interaction client 104; the communication of media files (e.g., images or video) from an interaction client 104 to the interaction servers 126; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The user systems 102 may include one or more sensors suitable for capturing a various moments in time, e.g., timelapse memory experience data. In one example, the sensor are Sensors may capture user biosignals, such as the user's heart rate, pulse oximetry signals (e.g., oxygen saturation, volume oxygen maximum (VO2 max)), pupil dilation, electrocardiogram (ECG or EKG) signals, electroencephalogram (EEG) data, visual data (e.g., video, pictures, light levels), sound data (e.g., conversations, ambient noise, background songs), location information (e.g., global positioning system (GPS) coordinates, global navigation satellite system (GLONASS) coordinates, inertial measurement unit (IMU) data), microlocation information (e.g., ultra-wideband (UWB), Bluetooth low energy (BLE) microlocation, acoustic microlocation, and so on, suitable for determining a position within inches in a target environment). In some embodiments, the sensors may be disposed in devices other than those of the user system 102, such as external cameras (e.g., volumetric camera rigs), microphones, and the like. For example, certain stages and camera rigs, such as a 3D volumetric capture system, may be used to capture full 3D volume recordings as opposed to flat images of participants and objects.

Indeed, memory experience data may be recorded from a variety of sources, including multiple users, various types of sensors, and camera systems, and then indexed or data fused into a timelapse memory representative of a range of time (e.g., minutes, hours, days, weeks, months, years) being captured. The memory experience data may be transmitted to be stored in certain databases, such as the database 130. The data may additionally or alternatively be stored via third-party servers 112.

The various sensors, including sensors disposed in the user system 102 are additionally used for triggering certain social re-experiences. For example, if a trigger includes a location, location sensor(s) detect that a user is inside the trigger location, and trigger derives that there is a stored memory experience involving the trigger location and one or more participants. In some examples having multiple participants, the trigger is used to automatically invite the multiple participants to a presentation of the memory experience associated with the location. The participant owner of the memory experience can also invite additional participants or change the participant list.

In some examples an AR arrow may be displayed to aid the participant(s) in navigating to the location to experience a memory experience presentation. Similarly, sounds, such as a song being played, weather conditions, such as certain cloud formations, heart rate, ambient light levels, smells, tastes, touch, visuals, and so on, may trigger a social memory experience presentation that involve multiple participants. As mentioned earlier, in some examples the triggers include multi-use triggers that are used both for detecting that a memory experience is present as well as for creating multisensory memory experience presentations, including AR and/or VR presentations of the memory experience.

The memory experience is presented via an AR and/or VR system which may be included in the user system 102. More specifically, memory experience data retrieved via the interaction servers 126, the third-party servers 112, the user system 102, or a combination thereof, can be used to create a memory experience. The memory experience can be presented using AR and/or VR techniques via the user system 102. For example, the user system 102 displays visualizations, emanate smells, direct haptic touches, sends commands to internet-of-things (IoT) devices, and so on, to create a contextually immersive experience that recalls the stored memory or memories that have been triggered.

The memory experience can be presented both locally (e.g., at a trigger location) or remotely the participants, e.g., the social network. The memory experience presentation includes synchronous and/or asynchronous modes. The synchronous mode projects the memory experience using the same timeline (e.g., same start and end for the presentation) among the member of the social network. That is, all participants in the synchronous mode participate in the presentation as a group, seeing each other and interacting with the same objects found in the presentation. The asynchronous mode records a new memory experience of one or more participants interacting with the originally stored memory experience and then delivers the new memory experience to participants for viewing at a later time. In this manner, the social network users re-experience a multisensory environment that more closely matches the original captured memory.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources (e.g., applications 106 or applets), such as a social memory experience, video chats, and so on. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface). It is also to be noted that, in some embodiments, applications 106 or applets may have access to data stores (e.g., via database server 128 and/or third-party server 112) used for storing memory experiences data. That is, the applications 106 can also access various sensors suitable for capturing memory experiences, are capable of triggering memory experiences, and can additionally be used to present AR/VR content created based on the triggers.

System Architecture

Figure 2:
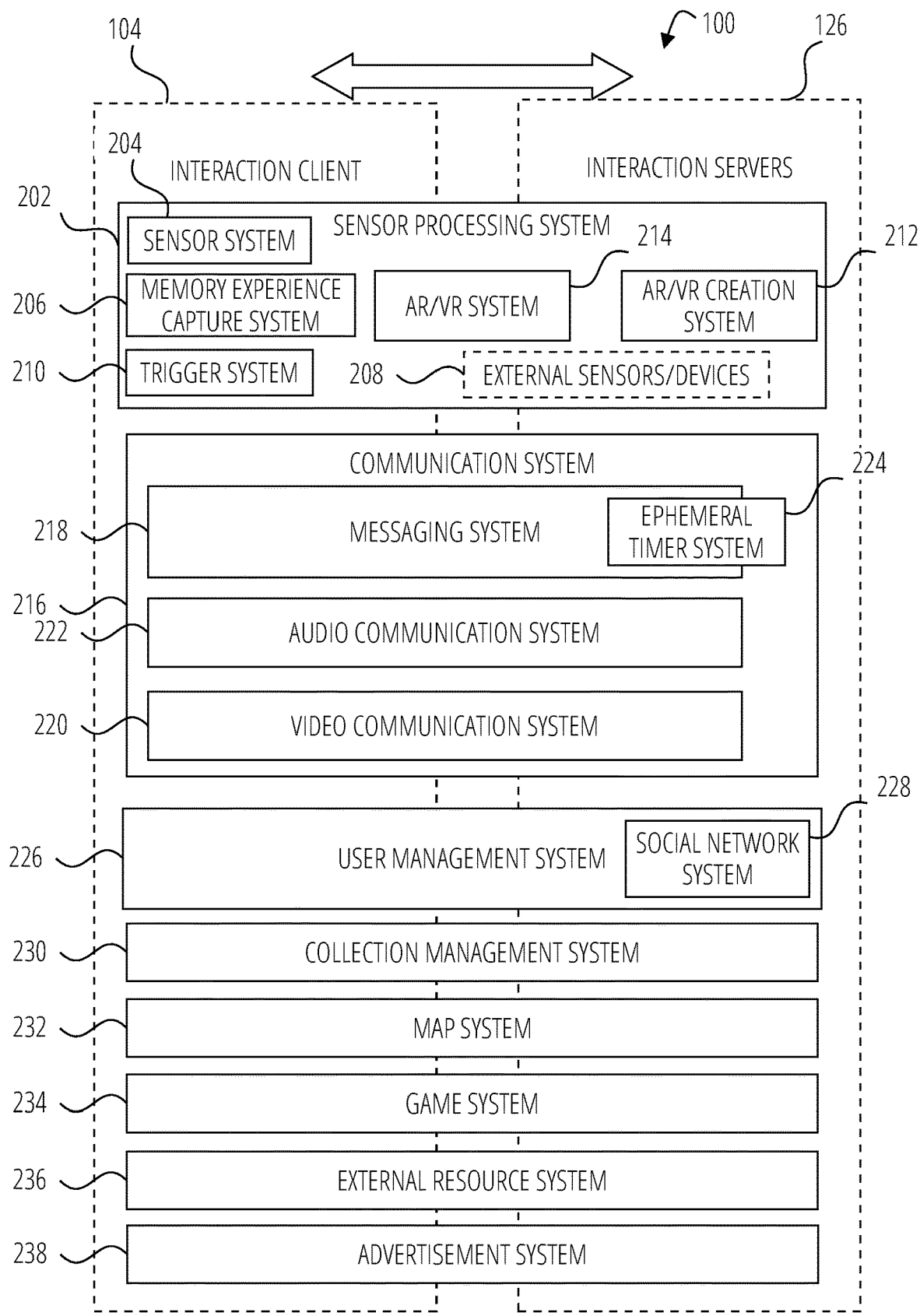
FIG. 2 is a diagrammatic representation of messaging system and a sensor processing system having a memory experience capture system, according to some examples, that has both client-side and server-side functionality.

FIG. 2 is a block diagram illustrating further details regarding the interaction system 100, according to some examples. Specifically, the interaction system 100 is shown to include the interaction client 104 and the interaction servers 126. The interaction system 100 embodies multiple subsystems, which are supported on the client-side by the interaction client 104 and on the server-side by the interaction servers 126. Example subsystems are discussed below.

A sensor processing system 202 provides various functions that enable a user to capture and augment (e.g., annotate or otherwise modify or edit) media content and other content. In some examples, the media content and other content may be associated with a message. Likewise, the sensor processing system 202 may capture media content and other content that may be associated with a memory experience. A sensor system 204 includes control software (e.g., included in an application) that interacts with and controls hardware, such as camera hardware (e.g., directly or via operating system controls), drone hardware, mobile device hardware, and the like, of the user system 102, to capture, modify and augment real-time images and other sensor data.

In addition to capturing and augmenting visual data via a various hardware of the user system 102, the sensor system 204 may additionally capture and augment data from external sensors/devices 208 that are external to the user system 102 (e.g., data from sensors and/or devices proximate to the user), such as sound sensors, lighting sensors (e.g., lighting level sensors, color sensors), temperature sensors, location sensors, microlocation sensors, biosignal sensors, smell sensors, taste sensors, IoT devices, and/or weather sensors. Smell sensors may include quartz crystal microbalance (QCM) sensors, gas chromatography sensors, metal oxide gas sensors, and the like, suitable for detecting one or more smells. Taste sensors may include e-tongue sensors, such as lipid/polymer membranes that transform information about substances producing taste into electrical signals.

Other external sensors/devices 208 may additionally include volumetric recording devices that may capture videos and images of 3D spaces captured in three-dimensions (as well as audio signals recorded with volumetric videos and images). The volumetric recording devices may include devices that may be controlled by the user system 102, as well as devices external to the user system 102, which may be included in the external sensors/devices 208.

The external sensors/devices 208 may additionally or alternatively include sensors and devices, including IoT devices, disposed near or on the user (e.g., external cameras, sensors on smartwatches, weather station sensors) useful in capturing data related to the proximate environment of the user. The sensor system 204 may capture data continuously or based on the user initiating and stopping a recording. The sensor system 204 may also capture data on at scheduled times, based on the user entering a location, based on the user encountering certain participants, and based on the user engaging in certain activities (e.g., sports activities, social activities).

A memory experience capture system 206 is also illustrated, which provides various functions that enable a user to capture a timelapse memory experience. For example, the memory experience capture system 206 may interface with the sensor system 204 and the external sensors/devices 208 to capture some (or all) of the data from various sensors and store the captured data as a timelapse memory experience stored via the database server 128 and/or the third-party servers 112. The moment in time may be any length of time used for the recorded timelapse memory experience, such as a fixed time, e.g., 5 minutes, 30 minutes, 1 hour, 5 hours, variable time (e.g., recording starts when entering a venue and stops when leaving a venue), event-based time (e.g., recording starts at concert start time and stops at concert end time), and user selected time (e.g., user starts a recording and/or user stops a recording).

In some examples, the database server 128 and/or the third-party server 112 may store the timelapse memory experience by storing the data captured in a data store (e.g., database 130) and then relating or otherwise linking the data captured by the timelapse memory experience capture system 206 to each other and/or to a date and a time and/or to one or more participants, for example, by using indexes, tables, collections (e.g., object-oriented database collections), and the like. Accordingly, queries may be provided, that may include a list of participants, a social network, a location (e.g., geographic coordinates, street address, venue name, microlocation), a sound, a song, an event (e.g, sporting event, concert, family event), an activity (sporting activity, family activity, school activity), a weather condition (e.g., cloud shapes, weather event such as rain), a picture, a video, (including a volumetric video), one or more biosignals, or a combination thereof. The queries are used by a trigger system 210 to determine if timelapse memory experience data is currently stored in the data store and the social network or participants involved in the memory experience. The social network is then provided with an AR and/or VR memory experience presentation created based on the data.

For example, the trigger system 210 continuously monitors various sensors of the sensor system 204 and/or the external sensors/devices 208 to extract certain data (e.g., location, microlocation, people, pets, weather conditions, objects, smells, tastes, lighting conditions, biosignals). In certain embodiments, the trigger system 210 submits a query that includes a location, a microlocation, a person, a social network, a picture, a video, a sound, a smell, a taste, a weather condition (e.g., cloud pattern, rain pattern, temperature, pressure, humidity), a lighting condition (e.g., a lighting level, an ambient light color), a time, a date, a pet, and/or a biosignal to a data store via the database server 128 and/or the third-party server 112 to determine if there is data stored that matches data associated with one or more stored timelapse memory experiences. If there is a match, an AR/VR creation system 212, creates an AR and/or a VR memory experience which includes certain timelapse aspects, as further described below.

The created AR and/or VR memory experience is presented via an AR/VR system 214. For the presentation, the AR/VR system 214 may use the user system 102 and/or the external sensors/devices 208, including IoT devices (e.g., via IoT device command(s) for turning lights at a certain lighting level and/or color, adjusting fan speed settings, adjusting air conditioner temperatures, turning smart switches on/off, and so on). Accordingly, the timelapse memory experience presentation includes visual displays (e.g., pictures, video, including volumetric video), audio, smells, tastes, and/or touch (e.g., via haptic techniques) suitable for immersing the user in a more contextual memory presentation experience.

In the depicted embodiment, the AR/VR system 214 provides, among other functions, functions related to the generation and publishing of augmentations (e.g., media overlays) for images captured in real-time by cameras of the user system 102 or retrieved from memory of the user system 102. Immersive visualizations for virtual reality systems may also be generated and published, such as 3D visualizations of people, objects, and backgrounds. In one AR example, the AR/VR system 214 operatively selects, presents, and displays media overlays (e.g., an image filter or an image lens) to the interaction client 104 for the augmentation of real-time images received via the sensor system 204 or stored images retrieved from memory 502 of a user system 102. In one VR example, the AR/VR system 214 creates an immersive environment that includes 3D representations of people and objects disposed in a virtual environment that is user navigable. These augmentations are selected by the AR/VR system 214 and presented to a user of the interaction client 104, based on a number of inputs and data, such as for example:

Geolocation of the user system 102;
Social network information of the user of the user system 102; and
timelapse memory experience data triggered via the trigger system 210.

An augmentation may include audio and visual content and visual effects. Examples of audio and visual content include pictures, video (including volumetric video), texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the sensor processing system 202 may interact with, and support, the various subsystems of the communication system 216, such as the messaging system 218 and the video communication system 220.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the sensor processing system 202 uses the geolocation of the user system 102 to identify a media overlay that includes the name of a merchant at the geolocation of the user system 102. The media overlay may include other indicia associated with the merchant. The media overlays may be stored in the databases 130 and accessed through the database server 128. The sensor processing system 202 provides a user-based publication platform that enables users to select a geolocation on a map and upload content associated with the selected geolocation. The user may also specify circumstances under which a particular media overlay should be offered to other users. The sensor processing system 202 generates a media overlay that includes the uploaded content and associates the uploaded content with the selected geolocation.

The AR/VR creation system 212 supports augmented reality and/or virtual reality developer platforms and includes an application for content creators (e.g., artists and developers) to create and publish augmentations (e.g., augmented reality experiences) of the interaction client 104, as well as immersive visualizations for virtual reality presentations. The AR/VR creation system 212 provides a library of built-in features and tools to content creators including, for example custom shaders, tracking technology, and templates. The AR/VR creation system may also provide for volumetric capture and processing, such as video editing suitable for using volumetric video in an AR and/or a VR presentation environment.

The AR/VR creation system can use the trigger system 210 triggers to create content. Indeed, the triggers may be used both for triggering a timelapse memory experience as well as for creating content used to deliver the timelapse memory experience. In certain examples, the trigger data (e.g., a picture, a video, a sound, a smell, a taste, weather condition, a location, a microlocation, a lighting condition, a time, a date, a person, a pet, a social network, a biosignal) is transformed into an AR and/or into a VR augmentation, as described in more detail below.

In some examples, the AR/VR creation system 212 additionally provides for a merchant-based publication platform that enables merchants to select a particular augmentation associated with a geolocation via a bidding process. For example, the AR/VR creation system 212 associates a media overlay of the highest bidding merchant with a corresponding geolocation for a predefined amount of time. As mentioned earlier, augmentations include augmented reality (AR), virtual reality (VR) and mixed reality (MR) content items, overlays, image transformations, images, and modifications that may be applied to image data (e.g., videos or images).

A communication system 216 is responsible for enabling and processing multiple forms of communication and interaction within the interaction system 100 and includes a messaging system 218, an audio communication system 222, and a video communication system 220. The messaging system 218 is responsible for enforcing the temporary or time-limited access to content by the interaction clients 104. The messaging system 218 incorporates multiple timers (e.g., within an ephemeral timer system 224) that, based on duration and display parameters associated with a message or collection of messages (e.g., a story), selectively enable access (e.g., for presentation and display) to messages and associated content via the interaction client 104. Further details regarding the operation of the ephemeral timer system 224 are provided below. The audio communication system 222 enables and supports audio communications (e.g., real-time audio chat) between multiple interaction clients 104. Similarly, the video communication system 220 enables and supports video communications (e.g., real-time video chat, including holographic video chat and/or volumetric video chat) between multiple interaction clients 104. A user management system 226 is operationally responsible for the management of user data and profiles and includes a social network system 228 that maintains information regarding relationships between users of the interaction system 100.

In one example, the social network system 228 maintains a list of one or more social networks, and for each social network, a list of timelapse memory experiences that have been captured by one or more members of the social network. The social network system 228 is used by the trigger system 210 to notify each participant in social network associated with a trigger when the trigger results in the discovery of a stored timelapse memory experience. Once the trigger system 210 discovers that a timelapse memory experience is stored in the data store (e.g., database 130), the trigger system 210 then uses the social network system 228 to notify all members of the social network that a timelapse memory experience is ready for re-experiencing.

A collection management system 230 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 230 may also be responsible for publishing an icon that provides notification of a particular collection to the user interface of the interaction client 104. The collection management system 230 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 230 employs machine vision (or image recognition technology) and content rules to curate a content collection automatically. In certain examples, compensation may be paid to a user to include user-generated content into a collection. In such cases, the collection management system 230 operates to automatically make payments to such users to use their content.

A map system 232 provides various geographic location functions and supports the presentation of map-based media content and messages by the interaction client 104. For example, the map system 232 enables the display of user icons or avatars (e.g., stored in profile data 310) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 234 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 236 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 126. The SDK includes Application Programming Interfaces (APIs) with functions that can be called or invoked by the web-based application. The interaction servers 126 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 126 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 126. The interaction servers 126 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth. An advertisement system 238 operationally enables the purchasing of advertisements by third parties for presentation to end-users via the interaction clients 104 and also handles the delivery and presentation of these advertisements.

Data Architecture

Figure 3:
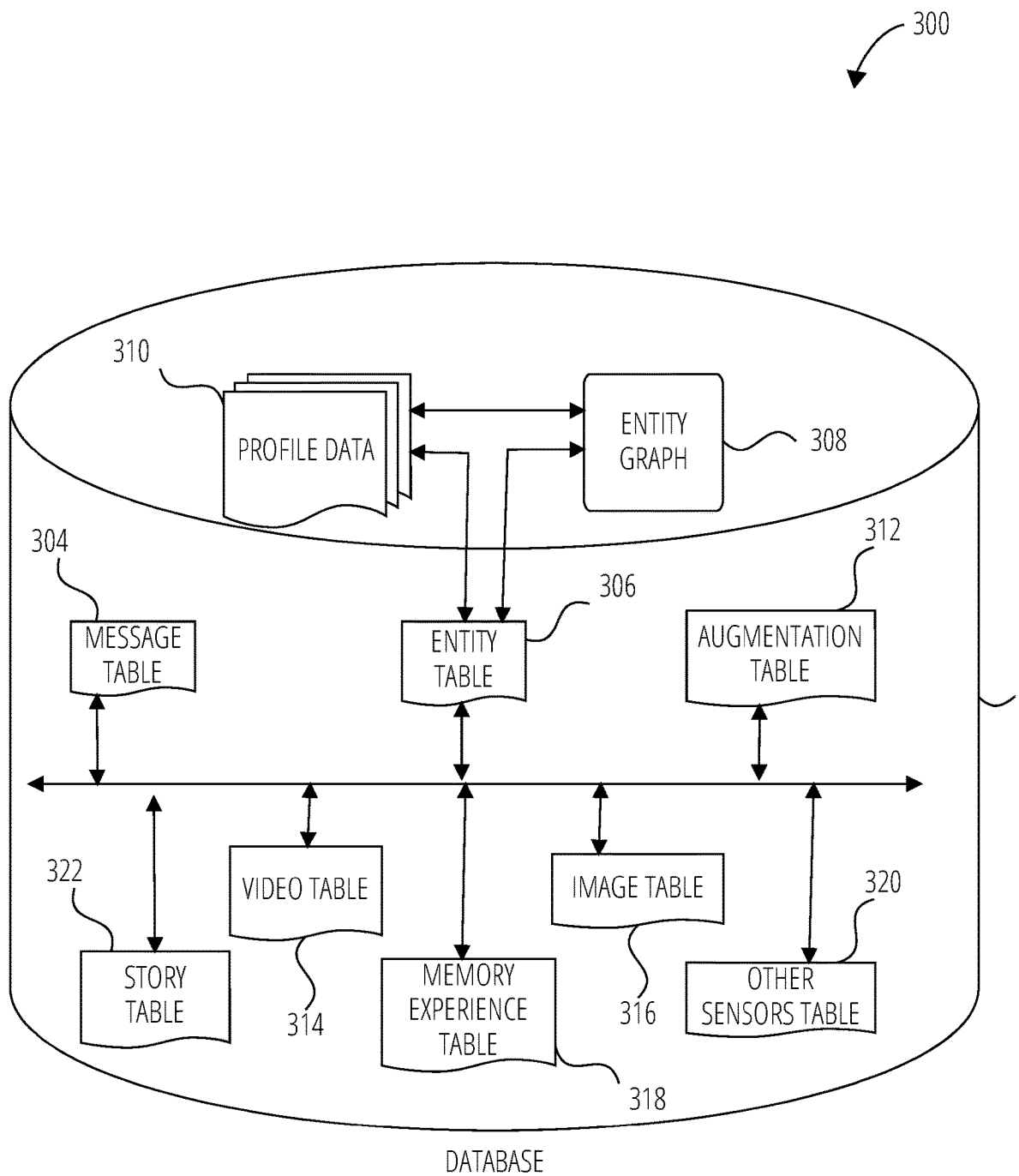
FIG. 3 is a diagrammatic representation of a data structure suitable for storing memory experience data as maintained in a database, according to some examples.

FIG. 3 is a schematic diagram illustrating data structures 300, which may be stored in the database 302 of the interaction server system 110, according to certain examples. While the content of the database 302 is shown to comprise multiple tables, it will be appreciated that the data could be stored in other types of data structures (e.g., as an object-oriented database) and in other server systems.

The database 302 includes message data stored within a message table 304. This message data includes, for any particular message, at least message sender data, message recipient (or receiver) data, and a payload. Further details regarding information that may be included in a message, and included within the message data stored in the message table 304, are described below with reference to FIG. 3.

An entity table 306 stores entity data, and is linked (e.g., referentially) to an entity graph 308 and profile data 310. Entities for which records are maintained within the entity table 306 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the interaction system 100, or may selectively be applied to certain types of relationships.

The profile data 310 stores multiple types of profile data about a particular entity. The profile data 310 may be selectively used and presented to other users of the interaction system 100 based on privacy settings specified by a particular entity. Where the entity is an individual, the profile data 310 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 310 for the group may similarly include one or more avatar representations associated with the group, in addition to the group name, members, and various settings (e.g., notifications) for the relevant group. The database 302 also stores augmentation data, such as overlays or filters, in an augmentation table 312. The augmentation data is associated with and applied to videos (for which data is stored in a video table 314) and images (for which data is stored in an image table 316). Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time. Other augmentation data that may be stored within the image table 316 includes augmented reality and/or virtual reality content items (e.g., corresponding to applying Lenses or augmented reality experiences as well as virtual reality experiences). An augmented reality and/or virtual reality content item may be a real-time special effect and sound that may be added to an image or a video.

As described above, augmentation data includes augmented reality (AR) content items, virtual reality (VR) content items, and mixed reality (MR) content items, such as overlays, image transformations, images, and modifications that may be applied to image data (e.g., videos or images including volumetric video). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data for augmentations based on captured timelapse memory experiences may be stored in a memory experience table 318. As mentioned above, a timelapse memory experience may include image and video data which may be stored in the image table 316 and video table 314 respectively, but also other sensor data such as a user's biosignals (e.g, heart rate, oxygen saturation, VO2 max, pupil dilation, electrocardiogram (ECG and/or EKG) signals, electroencephalogram (EEG) data), other visual data (e.g., light levels, colors), sound data (e.g., conversations, ambient noise, background songs), location information (e.g., global positioning system (GPS) coordinates, global navigation satellite system (GLONASS) coordinates, inertial measurement unit (IMU) data), microlocation information (e.g., ultra-wideband (UWB), Bluetooth low energy (BLE) microlocation, acoustic microlocation, and so on). The other sensor data may be stored in one or more other sensors table(s) 320.

In certain embodiments, the memory experience table 318 stores certain record identification (ID) information (e.g., records IDs) linking a given timelapse memory experience to records stored in the video table 314, the image table 316, the other sensors table 320, and the entity table 306. Ownership of a timelapse memory experience table as well as participant data, including group or social media data may be linked via the entity table 306. Accordingly, triggers, such as a picture, a video, a sound, a smell, a taste, a weather condition, a location, microlocation, a lighting condition, a time, a date, a person, a pet, a social network, and/or a biosignal, may be queried against data stored in database 302 (e.g., entity table 306, video table 314, image table 316, memory experience tables 318, and/or other sensors table 320) to determine if one or more timelapse memory experiences are stored and which entity, including groups, owns the memory experience.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of the interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 322 stores data regarding collections of messages and associated image, video, audio data, or other sensor data which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may use a second degree of authentication to verify that the end-user belongs to a specific organization or other entity (e.g., is a student on the university campus).

An additional type of content collection is referred to as a "timelapse memory experience story," which provides for a user of the user system 102 to contribute timelapse memory experience data (e.g, pictures, video, including volumetric video, sounds, smells, tastes, weather conditions, lighting conditions, biosignals) to a timelapse memory experience that may be captured with other users. Each user contribution may then be merged into a single memory experience, which may include various user perspectives and associated timelapse memory experience data.

Data Communications Architecture

Figure 4:
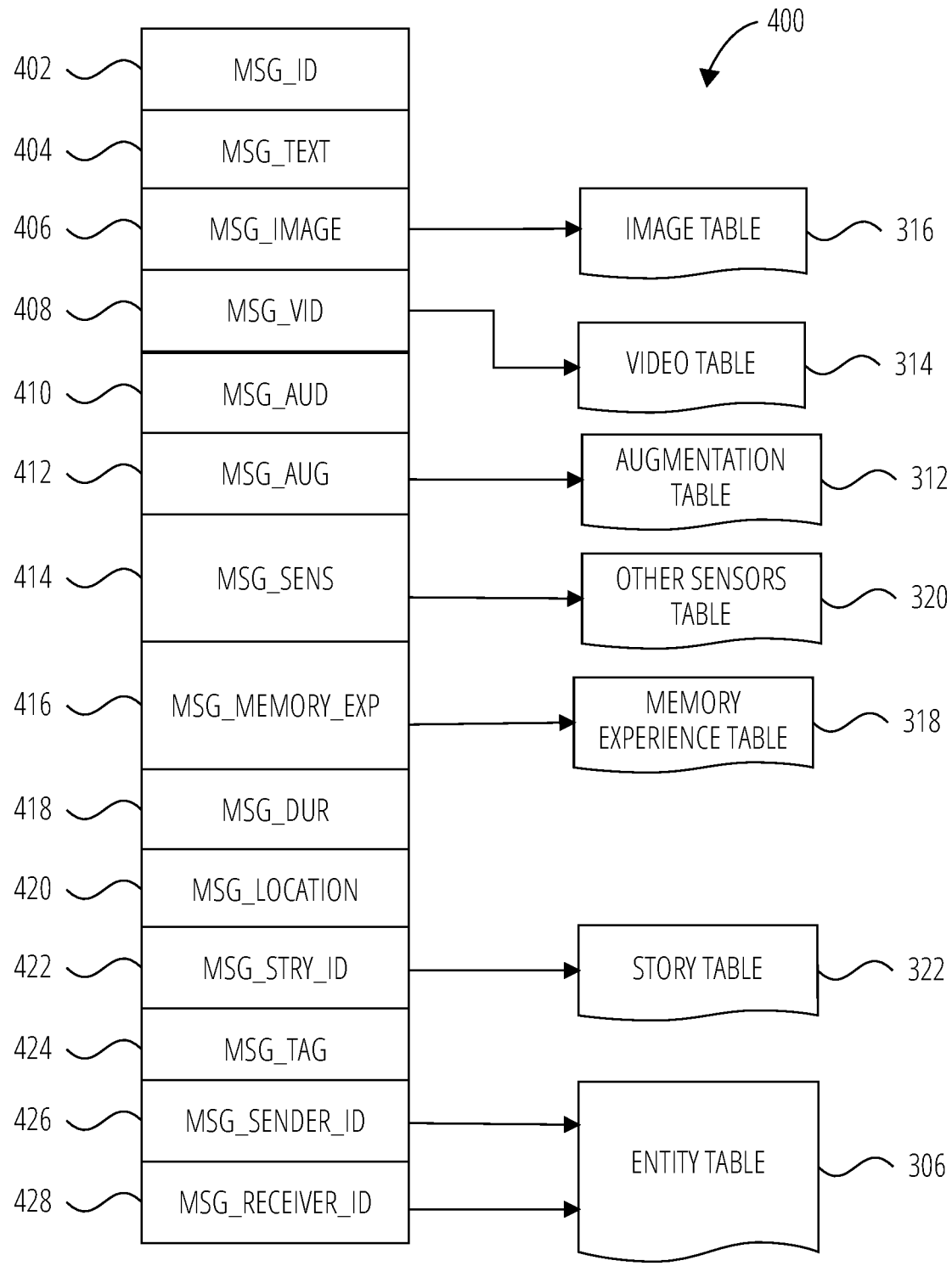
FIG. 4 is a diagrammatic representation of a message that may include memory experience data communications, according to some examples.

FIG. 4 is a schematic diagram illustrating a structure of a message 400, according to some examples, generated by an interaction client 104 for communication to a further interaction client 104 via the interaction servers 126. The content of a particular message 400 is used to populate the message table 304 stored within the database 302, accessible by the interaction servers 126. Similarly, the content of the message 400 is stored in memory as "in-transit" or "in-flight" data of the user system 102 or the interaction servers 126. The message 400 is shown that may include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data, including volumetric video, for a sent or received message 400 may be stored in the video table 314.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message sensor data 414: sensor data (e.g., data such as biosignals, sound, lighting conditions, weather conditions, accelerometer data, gyroscopic data, smell data, taste data, touch data) captured via the sensor system 204 and/or the external sensors/devices 208 that may be stored in the other sensors table 320.

Message memory experience data 416: data relating records stored in the entity table 306 (e.g., timelapse memory experience ownership records), image table 316, the video table 314, the augmentation table 312, and the other sensors table 320 to a timelapse memory experience (e.g., a moment in time) stored in the memory experience table 318. Location, microlocation, participants, pets, date of the memory, time of the memory, sports activity for the memory, social activity for the memory, may also be included in the message memory experience data 416.

Message duration parameter 418: parameter value indicating, in seconds, the amount of time for which content of the message (e.g., the message image payload 406, message video payload 408, message audio payload 410) is to be presented or made accessible to a user via the interaction client 104.

Message geolocation parameter 420: geolocation data (e.g., latitudinal and longitudinal coordinates) and/or microlocation associated with the content payload of the message. Multiple message geolocation parameter 420 values may be included in the payload, each of these parameter values being associated with respect to content items included in the content (e.g., a specific image within the message image payload 406, or a specific video in the message video payload 408).

Message story identifier 422: identifier values identifying one or more content collections (e.g., "stories" identified in the story table 322) with which a particular content item in the message image payload 406 of the message 400 is associated. For example, multiple images within the message image payload 406 may each be associated with multiple content collections using identifier values.

Message tag 424: each message 400 may be tagged with multiple tags, each of which is indicative of the subject matter of content included in the message payload. For example, where a particular image included in the message image payload 406 depicts an animal (e.g., a lion), a tag value may be included within the message tag 424 that is indicative of the relevant animal. Tag values may be generated manually, based on user input, or may be automatically generated using, for example, image recognition.

Message sender identifier 426: an identifier (e.g., a messaging system identifier, email address, or device identifier) indicative of a user of the user system 102 on which the message 400 was generated and from which the message 400 was sent.

Message receiver identifier 428: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 418 may point to data stored in an augmentation table 312, values stored within the message story identifier 422 may point to data stored in a story table 322, values stored within the message sender identifier 426 and the message receiver identifier 428 may point to user records stored within an entity table 306, and values stored in the message memory experience data 416 may point to records stored in the entity table 306, the image table 316, the video table 314, the augmentation table 312, and the other sensors table 320.

System with Head-Wearable Apparatus

Figure 5:
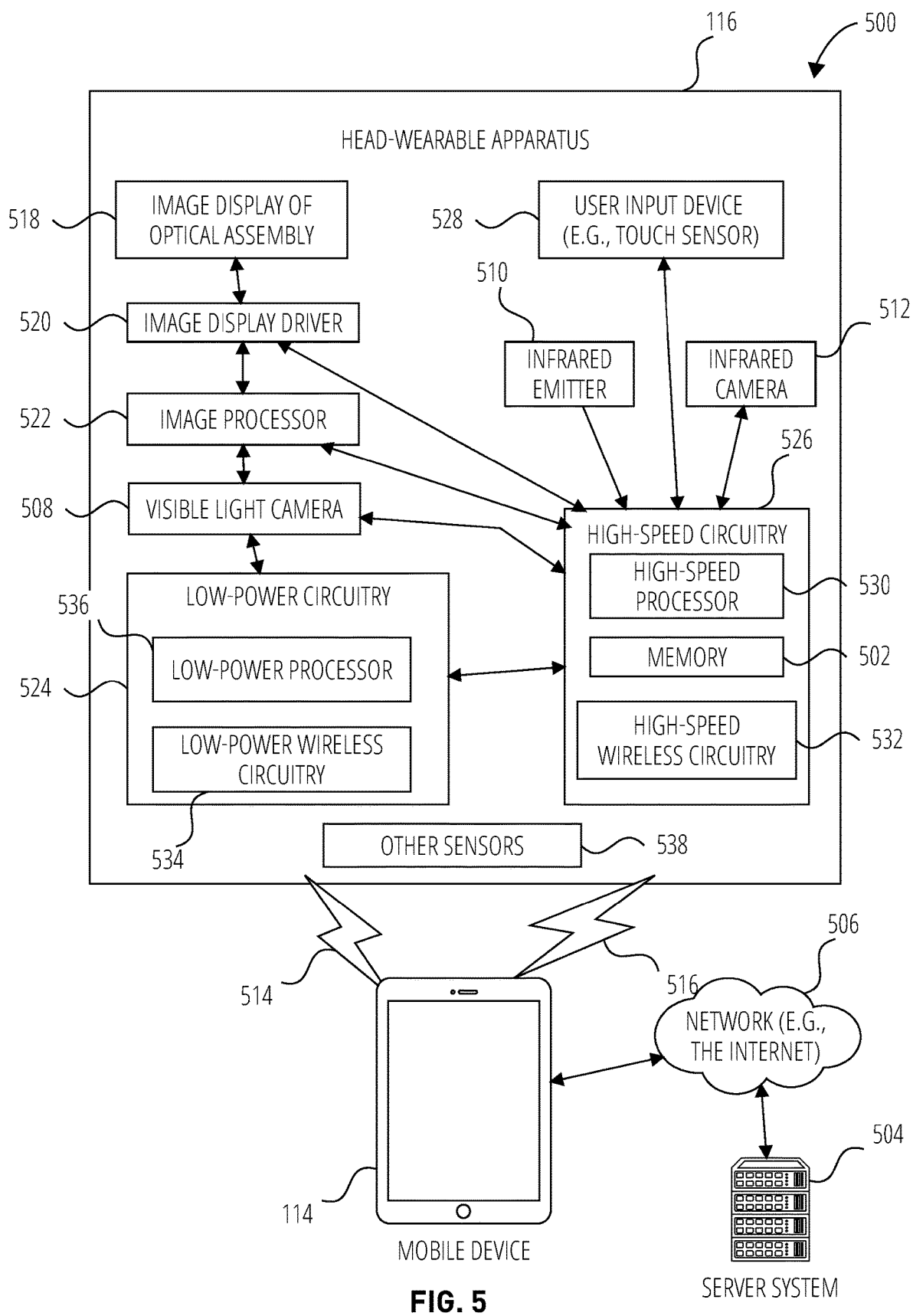
FIG. 5 illustrates a head-wearable apparatus communicatively coupled to various systems, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 508, an infrared emitter 510, and an infrared camera 512. The mobile device 114 connects with head-wearable apparatus 116 using both a low-power wireless connection 514 and a high-speed wireless connection 516. The mobile device 114 is also connected to the server system 504 and the network 506.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Graphics (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a printed circuit board (PCB) or flexible PCB, in the rims or temples. Alternatively, or additionally, the depicted components can be located in the chunks, frames, hinges, or bridge of the head-wearable apparatus 116. Left and right visible light cameras 508 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device. As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 516 to a wireless local area network (WLAN) using the high-speed wireless circuitry 532. In certain examples, the high-speed processor 530 executes an operating system such as a LINUX® operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 702.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 514 and the high-speed wireless connection 516, may be implemented using details of the architecture of the head-wearable apparatus 116, as can other elements of the network 506.

The memory 502 includes any storage device capable of storing various data and applications, including, among other things, camera data generated by the left and right visible light cameras 508, the infrared camera 512, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 508, infrared emitter 510, or infrared camera 512), the image display driver 520, the user input device 528 (e.g., touch sensor or push button), and the memory 502. The head-wearable apparatus 116 is connected to a host computer. For example, the head-wearable apparatus 116 is paired with the mobile device 114 via the high-speed wireless connection 516 or connected to the server system 504 via the network 506. The server system 504 may be one or more computing devices as part of a service or network computing system, for example, that includes a processor, a memory, and network communication interface to communicate over the network 506 with the mobile device 114 and the head-wearable apparatus 116.

The mobile device 114 includes a processor and a network communication interface coupled to the processor. The network communication interface allows for communication over the network 506, low-power wireless connection 514, or high-speed wireless connection 516. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, location components, microlocation components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), microlocation information, Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 514 and high-speed wireless connection 516 from the mobile device 114 via the low-power wireless circuitry 534 or high-speed wireless circuitry 532.

Timelapse memory experience content taken via the head-wearable apparatus 116 may include pictures, audio, and/or video. In some examples of video capture via the head-wearable apparatus 116, the video captured is used to create volumetric video content, including video content taken via multiple head-wearable apparatuses 116. In one example, the video captured is synchronized so that individual frames of each video are identified as being taken at the same time, and then re-sorted to match a time of capture. After the video frames are synchronized and re-sorted, photogrammetric techniques are used for a time-step-based mesh construction. For example, the photogrammetric techniques extract 3D objects from a 2D frame by detecting overlapping regions in the 2D objects in different frames, by performing feature extraction by detecting features uniquely recognizable in multiple images, and/or by triangulation via reconstruction of lines of sight from the cameras to the 2D objects resulting in a ray cloud, thus creating a mesh or a point cloud of one or more 3D objects.

Timelapse memory experience content also includes sensor data from other sensors 538 that are disposed in the head-wearable apparatus 116, such as biosignal sensors (e.g., heart rate sensors, pulse oximetry sensors (e.g., oxygen saturation, VO2 max), pupil dilation sensors, electrocardiogram (ECG or EKG) sensors, electroencephalogram (EEG) sensors), location data, microlocation data, smell sensors, taste sensors, weather data (e.g., received via networked devices communicatively coupled to head-wearable apparatus 116), or a combination thereof.

Figure 6:
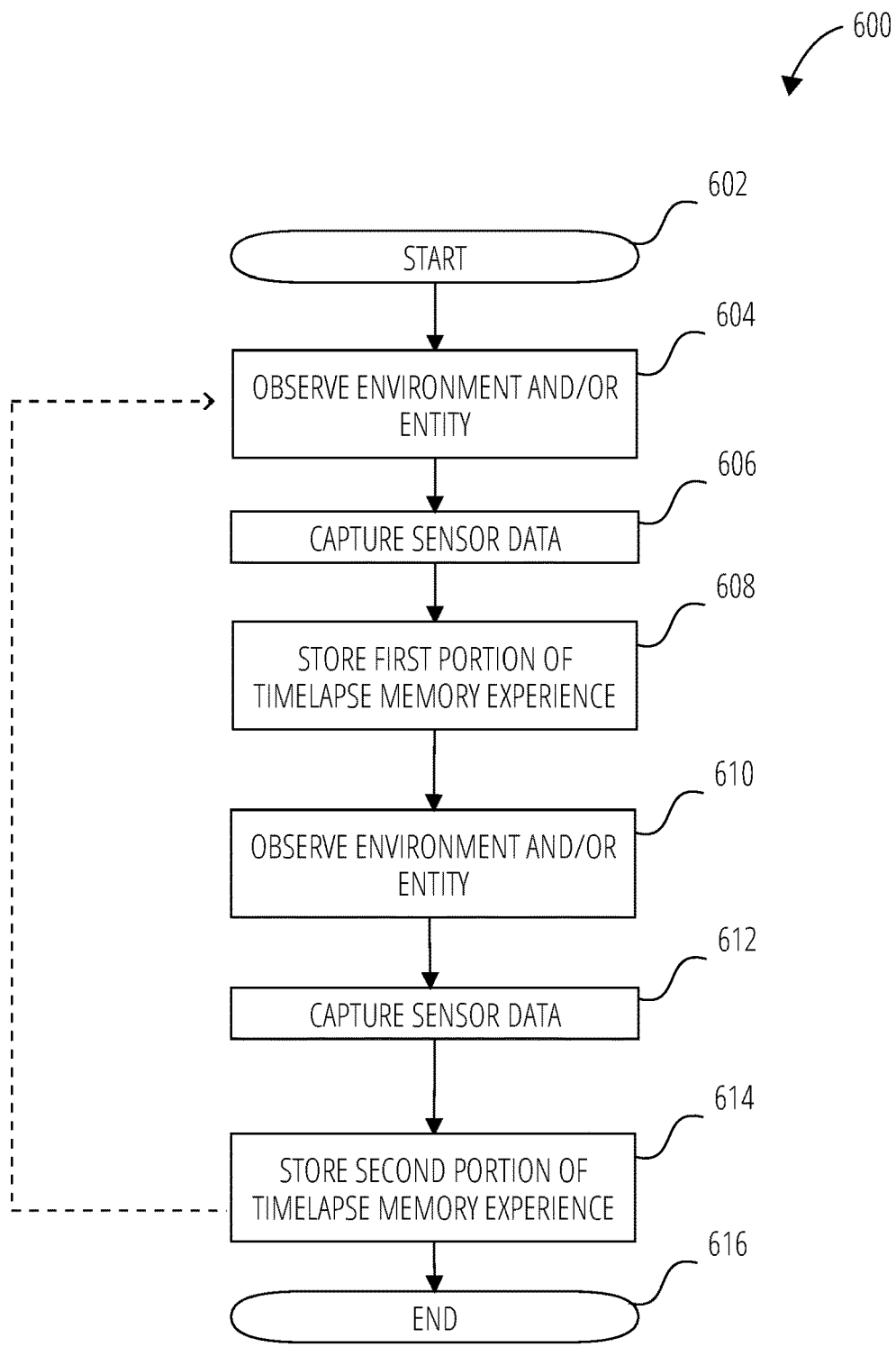
FIG. 6 is a flowchart for a memory experience capture process, according to some examples.

Turning now to FIG. 6, the figure is a flowchart illustrating a process 600 suitable for capturing a timelapse memory experience for social re-experiencing at a later time. The process 600 can be executed, for example, via the user system 102, the interaction client 104, the interaction server system 110, and/or the third-party servers 112. In the depicted embodiment, the process 600 begins at start block 602 and then observes an environment and/or an entity at block 604. For example, cameras, such as cameras included in mobile devices 114, head-wearable apparatuses 116, drones 118, computer client device 120, volumetric capture cameras, doorbell cameras, security cameras, and so on, record videos and capture pictures of an area (e.g., a target environment), such as a construction zone, a state park area, a picnic area, or any other physical location. The area may include entities like participants of an activity, pets, and objects of the environment undergoing observation. Other sensors, such as biosignal sensors, weather sensors, light level sensors, sound sensors, location sensors (e.g., GPS receivers, GLONASS receivers), microlocation sensors, IMU sensors, and the like, may also be used to capture the timelapse memory experience.

IoT devices may also be used in the capture of the timelapse memory experience, for example, lights may provide their lighting levels, colors, and/or lighting scenes. Likewise, fans, air conditioners, smart switches, smart outlets, and other IoT devices, may provide a status of operations that may be captured as a timelapse memory experience. In some examples when capturing sounds, music is detected by using techniques such as audio fingerprinting (e.g., via software techniques such as Shazam® application's music detection) and the music is stored either as the captured sounds and/or as links to previously stored music files.

In some embodiments, the timelapse memory experience capture at block 606 includes the use of volumetric video capture techniques. For example, volumetric video capture includes techniques that digitize a three-dimensional space (e.g., a volume of space), object, or environment using an array of cameras set around a target area. The captured objects are digitized and stored to be viewed in 3D via AR and/or VR devices. As mentioned earlier, multiple cameras can capture various angles or perspectives, and, in some examples, the video captured from the multiple cameras are synchronized so that individual frames of each camera's video are identified as being taken at the same time, and then re-sorted to match a time of capture. After the video frames are synchronized and re-sorted, photogrammetric techniques are used for a time-step-based mesh construction. For example, the photogrammetric techniques extract 3D objects from a 2D frame by detecting overlapping regions in the 2D objects in different frames, by performing feature extraction by detecting features uniquely recognizable in multiple images, by triangulation via reconstruction of lines of sight from the cameras to the 2D objects resulting in a ray cloud, and so forth, thus creating a mesh or a point cloud of one or more 3D objects. In other examples, special volumetric capture cameras may be used, that include techniques to be used as part of an array of other cameras, shutter synchronization, and/or time synchronization. Shutter synchronization and/or time synchronization enables video frames to have the same capture time.

In some examples, resulting presentations based on the captured volumetric video do not have a set viewpoint but rather a dynamic viewpoint, including viewpoint depth. Accordingly, the user can watch and interact with 3D objects from multiple angles, enhancing the user experience and heightening the sense of immersion and engagement. For example, a difference between 360-degree video and volumetric video is the viewpoint depth provided with volume. In a 360-degree video, users typically view the video from a single, constant viewpoint depth. With volumetric video, the users can control how far in or out of a scene to position their viewpoint.

Volumetric capture techniques may additionally or alternatively include embodiments disposing an array of cameras surrounding the target area, such as a basketball court, tennis court, concert arena, underwater reef, and so on. Cameras may be also disposed in drones, including underwater drones, and cameras may be carried by other users (e.g., disposed in the head-wearable apparatus 116). Cameras may also be located in nearby structures (e.g., doorbell cameras, security cameras, traffic cameras) and in vehicles (e.g., vehicle cameras). In example embodiments, various cameras' outputs are synchronized and further processed to produce a 3D mesh with 3D objects as described previously. The 3D objects include participants in an activity, furniture, sports objects (e.g., basketballs, tennis rackets), and other objects in the target environment such as trees, vehicles, pets, and the like. In addition to land-based environments used to capture data as a memory experience, the target environment may also include an underwater environment, such as when snorkeling or scuba diving and an aerial environment, such as when skydiving, ballooning, parasailing, and the like.

The capture of sensor data at block 606 captures data at a certain timeslot, for example, by capturing a building being built from 8 AM to 12 PM or at other times. Likewise, the capture of sensor data at block 606 when focusing on capturing the entity, such as a growing child, could occur capturing videos of the child sometime during the day, for example, for five minutes, 10 minutes, and so on. The sensor data captures are then stored at block 608, as a first portion of the timelapse memory experience.

Multiple observations and sensor captures of the same target area (e.g., construction zone, park, house, etc.) are then taken in to create a view through time (e.g, one week, one month, one year, one decade) of the target area and/or of a target entity. Accordingly, the timelapse memory experience can be re-experienced to see the construction of a building, the remodeling of a house, the changes in a park through the years (e.g., seeing the colors change in the fall, the leaves falling in winter), and so on. When observing an entity, the timelapse memory experience provides for a presentation, for example, of a child growing through the years, a puppy growing into an adult dog, a car undergoing a restoration process, and so on. Accordingly, multiple timeslots are taken and stored as respective multiple portions of the timelapse memory experience.

In block 610, the process 600 observes the environment and/or entity to store a subsequent portion of the timelapse memory experience. More specifically, the process 600 then captures sensor data at block 612, e.g., at a later time when compared to the capture at block 606, and then stores the captured sensor data at block 614. The process 600 iterates back to block 604, and thus can continuously capture multiple portions of data in time, creating a timelapse memory experience than can span hours, days, weeks, years, decades, or a combination thereof. The process 600 ends at block 616.

stores a list of participants of the memory experience, including one or more owners of the memory experience. An owner of the memory experience can edit the memory experience, such as by editing pictures, videos, including volumetric videos, lighting levels, and the like. The owner can also add other viewers to the memory experience, for example, to share the memory experience with users that were not original participants. The owner of the memory experience is thus given administrator rights to the memory experience and can assign rights to other participants, such as view only rights, edit rights, sharing rights with others, and so on. The participant list may also be grouped into participant groups or social networks, and each group or social network may also be assigned group rights, such as editing of content rights, sharing with new participants rights, sharing rights with others, and so on.

Figure 7:
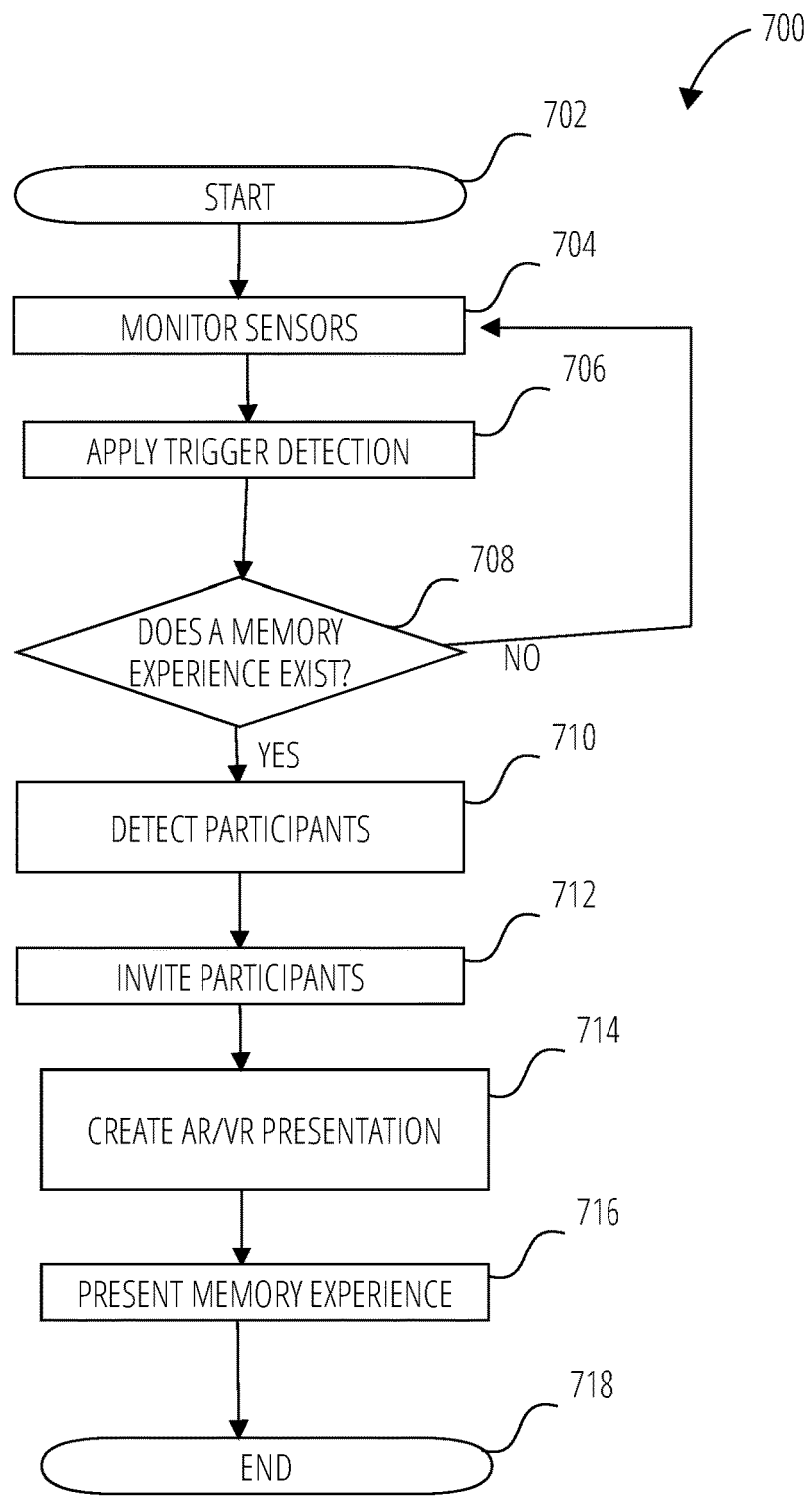
FIG. 7 is a flowchart for a process suitable for triggering, creating, and presenting a memory experience that may have been previously captured, according to some examples.

FIG. 7 is a flowchart illustrating a process 700 suitable for socially re-experiencing a memory experience that has been captured, for example, via the process 600 of FIG. 6. The process 700 can be executed, for example, via the user system 102, the interaction client 104, the interaction server system 110, and/or the third-party servers 112. In the depicted embodiment, the process 700 begins at start block 702 and then a computing device (e.g., mobile device 114, head-wearable apparatus 116, drone 118, and/or computer client device 120), monitors one or more sensors at block 704. For example, location sensors are monitored to determine a current location and/or microlocation. Likewise, cameras monitor a scene to identify participants, pets, objects, weather conditions (e.g., cloud shapes, rain patterns, lighting, thunder), lighting condition and the like. Similarly, smell and taste sensors are monitored to detect certain smells and tastes. IoT devices can also be monitored to determine their current status. For example, lights are monitored for lighting conditions, fans, air conditioners, smart switches, smart outlets, and other IoT devices, are also be monitored for a current status of operations.

The computing device then applies a memory experience trigger detection at block 706 to determine at block 708 if a memory experience is stored in a data store based on the monitoring. For example, a query may be submitted to the memory experience table 318 that includes memory experience trigger data such as a location, a microlocation, a list of participants, a social network, a picture, a video, a sound, a smell signal, a taste signal, a weather condition, a lighting condition, a time, a date, and/or a biosignal via the database server 128 and/or the third-party server 112 to determine if there is stored memory experience data (e.g., saved data) that matches the query. That is, the query includes memory experience trigger data (e.g, the location, the microlocation, the list of participants, the social network, the picture, the video, the sound, the smell signal, the taste signal, the weather condition, the lighting condition, the time, the date, the pet, and/or the biosignal) which is compared against stored memory experience data to determine if there is match. The stored memory experience data may thus be queried to see if there are matching locations, microlocations, participants, social networks, pictures, videos, sounds, smell signals, taste signals, weather conditions, locations, microlocations, lighting conditions, times, dates, people, pets, and/or biosignals.

In some embodiments, a match is found when a single data item of a memory experience trigger (e.g., a picture, a video, a sound, a smell profile, a taste profile, a weather condition, a location, a lighting condition, a color, a time, a person, a pet, a social network, and/or a biosignal) is found. In other embodiments, the match is found when multiple data items of a memory experience trigger are found, such as when matching a set of items, such as multiple pictures, videos, sounds, smell signals, taste signals, weather conditions, locations, microlocations, lighting conditions, times, dates, people, pets, social networks, and/or biosignals. The number and type of data items to use for a match is user or system configurable. In some examples, the matching also includes "partial" matching, such as cloud patterns that are similar but not exact to the original data capture. Likewise, a set of objects, such as furniture, vehicles, buildings, and so on, may be a partial match when they resemble the originally captured item. The use of partial matching includes fuzzy logic, data clustering, or other techniques that enable a comparison between the stored memory experience trigger data and the monitored data to, for example, output a weight indicating how close the match may be (e.g., a weight between 0 indicating no match to 100 indicating an exact match). In some examples, the user inputs match settings to customize the matching of memory experience trigger data. For example, the user may enter a "75% match", "90% match", and so on, as a setting to determine when a match occurs.

It is to be noted that memory experience owners and users with certain permissions can retrieve memory experiences manually without sensor monitoring. For example, the memory experience owner can query a list of stored memory experiences by name, or based on selecting a location, a microlocation, a date, a time, an object a person, a pet, weather, a sports activity, a social activity, a light condition, a weather condition, a biosignal, a smell, a taste, or a combination thereof, to select one or more memory experiences for re-experiencing.

If the computing device determines that no memory experience data exists at decision block 708 by attempting to match sensor data to memory experience data, the process 700 iterates back to block 704 to continue monitoring operations. If a memory experience data exists (e.g., monitored sensor data matches a memory experience data stored in a data store) at decision block 708, the process 700 then detects, at block 710, any participants included in the memory experience. The memory experience participants may include one or more persons, one or more groups, one or more social networks, or a combination thereof.

The process 700 then automatically invites, at block 712, all of the participants, including members of the groups and/or social networks. In one example, the process 700 uses the messages 400 to communicate to all of the participants, an invitation to re-experience the memory experience. Owner(s) of the memory experience can also invite, at block 712, other people, groups, and/or social networks that may have not been recorded as part of the memory experience. For example, relatives, other friends, social clubs, work colleagues, and so on, can be invited to join the re-experiencing of the memory experience. Recipients of the invitation can then accept or decline the invitation. The invitation can also be an ephemeral invitation, expiring after a certain amount of time.

At block 714, the computing device creates an AR and/or VR presentation, for example, by using the memory experience data in the data store. As mentioned above, the memory experience data can be used to both trigger the memory experience and also to create AR and/or VR content for the memory experience. During AR and/or VR content creation, the memory experience data is transformed into a media overlay, in one example. The media overlays may include pictures, video, sounds, music, avatars, colors, lighting levels, smells (e.g., via scent cartridges), tastes (e.g., via a digital lollipop), biosignal presentations (e.g., animations, graphs, sound beats) that may be presented as an AR augmentation and/or in a VR environment suitable for projecting as an enhanced memory experience. The presented videos may include 3D volumetric videos that enable the user to "walk" through the presentation and to change viewpoint depths into the presentation as desired. Accordingly, the process 700 may transform memory experience data associated with the memory experience into an augmented reality augmentation, a virtual reality augmentation, an avatar, an augmented reality object, a virtual reality object, a smell signal transmissible to a scent presentation device, a taste signal transmissible to a tasting device, a haptic force, an internet-of-things (IoT) device command, or a combination thereof.

At block 716, the created AR and/or VR visualization is presented. The presentation at block 716 of the memory experience uses AR/VR devices such as the head-wearable apparatus 116, the mobile device 114, computer client device 120 (e.g., portable computing device), a scent presentation device, a tasting device, and IoT device, and so on. Accordingly, the presentation of the AR and/or VR visualization includes displaying an avatar, displaying a picture, displaying a video, providing 3D navigation in a volumetric video, projecting a sound, playing music, executing an IoT command, displaying a lighting level, projecting a smell, projecting a taste, transforming a biosignal into a visualization or a sound, or a combination thereof. At block 718, the process 700 ends.

Some examples of the processes 600, 700 are as follows. when using location and/or microlocation as a trigger, a specific location and/or microlocation triggers a photo or a video (including a volumetric personal movie) from a past memory experience. During AR presentation, an AR path is presented so that participants can navigate the same or similar path taken the first time the data was captured, as if they were "walking down the memory lane." Biosignals (emotions/heartbeat) may also be used as trigger, such that when the current heartbeat is the same at a time that a stored heartbeat was captured, a picture pops up that includes a scene and/or people that were present during the capture of the original heartbeat. Biosignals presentations may additionally include visualizations of the trigger heartbeat, for example, using visual animations and sound effects. Lighting conditions used as a trigger, such as when a lighting level or color of light is detected, for example, based on stored trigger data for a memory experience data captured when a room was lit a certain way. A lighting presentation adjusts IoT devices (e.g., lights) to turn the room a certain color (e.g., red) at a desired lighting level. Indeed, the IoT devices may be used in conjunction with or alternative to the AR, VR techniques, to immerse the user in a memory experience.

Using a specific example of weather as a trigger, sensors (e.g., cameras and other weather sensors such as doppler radar) detect a specific type of weather condition, such as cloud formations. A photo or a video (including a volumetric AR scene) is displayed to project certain weather visualizations. For example, AR and/or VR presentations include displaying AR and/or VR clouds in the sky to recreate the weather based on the memory experience trigger. AR and/or VR may be similarly used to visualize wind, other weather (e.g., lightning, waterspouts, rain), and outdoor lighting conditions (e.g., how much light was present in the sky, the color of the sky).

An example of using sound as a memory experience trigger includes detecting that a song that is currently playing is associated with a captured memory experience. The sound triggers the presentation of a picture, a video, a volumetric scene, and so on, associated with the memory experience. Conversations also trigger additional memory experiences, for example, when a user says "hey, remember when we went to a party last year," a presentation of a picture (or a video or a volumetric scene) is presented from a party associated with the two participants that took place last year. Sound as a presentation includes dimming the current sound and playing the sound used to trigger the memory experience. For example, if upon entering a mall, the mall was previously playing a Taylor Swift song and is now playing a Justin Bieber song, the current song goes dim, and the Taylor Swift song from the memory experience takes over.

Smell can also be used as a memory experience trigger and/or as part of an AR/VR presentation. For example, if a user goes into a restaurant and orders the same food they had when they previously captured their dining experience, the smell of the food is sensed and can trigger memories from their last visit, including a picture (or a video or a volumetric AR scene). Smells may also be presented, for example, via techniques such as using scent presentation devices that use scent canisters (e.g., INHALE scent cartridges available from OVR Technology, of Burlington, Vermont, USA) to project scents. Certain memory experiences trigger smells as part of the AR/VR presentation. Accordingly, the user can re-experience one or more smells based on triggered memory experience. Tastes are sensed via taste sensors such as electronic tongue (e-tongue) sensors that use lipid/polymer membranes for transforming information about substances producing taste into electrical signals or derived via EEG brain sensing during tasting of food. Tastes may be presented by transmitting signals to a tasting device such as a "digital lollipop" device. The digital lollipop stimulates the tongue electrically via silver electrodes to generate tastes. Touch is used via haptic interfaces, both for input as well as output. For example, gloves are used that include mechanoreceptors sensitive to mechanical stresses that occur during a human touch to detect a user touching an object. Likewise, haptic actuators provide as output a sensation of touching various surfaces. Tastes and touch may trigger AR and/or VR media overlays to remember events that occurred during the originally captured taste or touch.

Objects may additionally be used as memory experience triggers. For example, if a user observes an object of interest, such as a chair, an AR and/or VR presentation that includes the chair may be created. For example, if the presentation is an AR presentation, when a user sees a chair where their grandfather used to sit to read the newspaper, a volumetric AR visualization of the grandfather sitting on the actual chair reading a newspaper is displayed. In another example, the object itself may be displayed. For example, a 3D clone of the chair is displayed in the location that the chair used to be located. In some examples, 3D clones of various objects are created via LiDAR mesh creation techniques such as Custom Landmarker Creator available from Snap, Inc., of Santa Monica, California, USA.

Additionally, virtual object presentations allow users to see older objects that are now replaced by newer objects, for example, by overlaying visualizations on the top of newer objects. In one example, an old billboard presentation in AR over a new billboard is displayed, allowing the user to reminisce about times when the older billboard was installed. Likewise, various stages of construction of a house, a building, and other structures may be overlaid on the new structure, providing for a memory experience of the various stages of construction.

People and pets may also be used as memory experience triggers. For example, when a user encounters a person or a pet, a memory experience is triggered that includes the person or the pet alongside the user as a picture, a video, and/or a volumetric presentation. As mentioned earlier, people and pet are captured via various techniques, such as pictures, video, and volumetric video capture techniques, and then AR and/or VR equivalent people and pet presentations are created and displayed based on the data captured. In the aforementioned grandfather example, the grandfather may be presented not only on the original chair, but elsewhere, such as a sofa, in a virtual chair, sitting beside the user, and so on.

Figure 8:
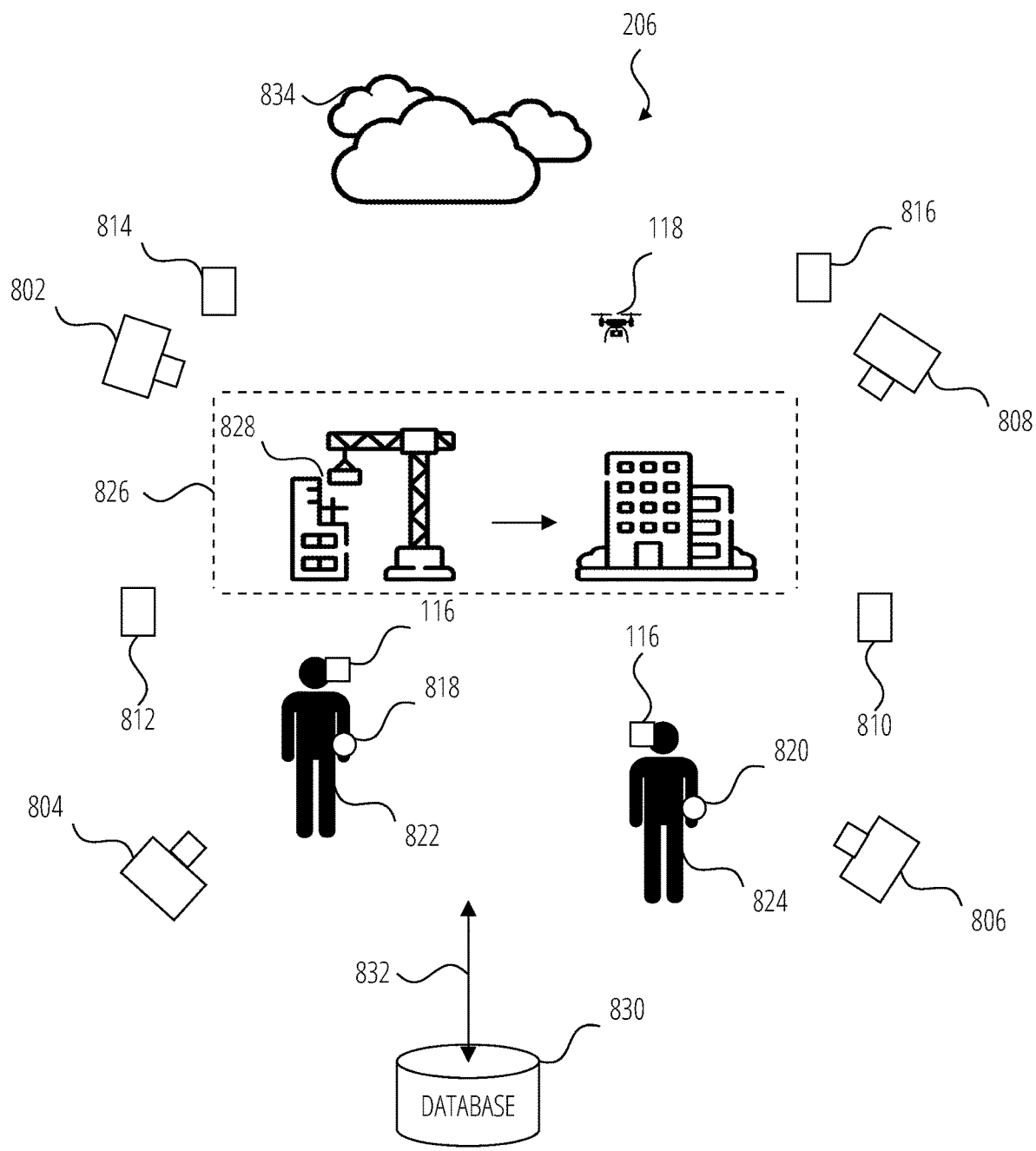
FIG. 8 illustrates a memory experience capture system, according to some examples.

FIG. 8 is a block diagram illustrating further details of an embodiment of the memory experience capture system 206 that may be used to capture and store memory experiences for one or more users. In the depicted embodiment, one or more cameras 802, 804, 806, 808 may be used to capture pictures and video, including volumetric video. One or more drones 118 may also be used, suitable for carrying a variety of sensors, including camera sensors. In some embodiments, the drones 118 may be used additional to or alternative to the cameras 802, 804, 806, 808. When capturing volumetric video, the cameras 802, 804, 806, 808 (and drones 118) may capture video from different angles surrounding a target area, such as an area that includes one or more participants, a sports activity, a social activity (e.g., a family gathering, a dinner date, a party), a location, an event (e.g., a concert, a business meeting, an appointment, a weather event), and so on.

In some embodiments, the cameras 802, 804, 806, 808 and drones 118 include depth perception techniques used to determine depth and or distance to various objects. The cameras 802, 804, 806, 808 may be standalone cameras or may be included in the head-wearable apparatus 116, in the mobile device 114, and/or in the computer client device 120. During volumetric processing, the memory experience capture system 206 uses the recorded video and synchronizes a start recording time for the various recordings. Creation of a volumetric video involves using video recordings from different angles and/or depths and applying certain video processing algorithms to "stitch" the views from these different angles together to create volumetric scenes suitable for display via AR and/or VR devices. As mentioned earlier, video captured may be synchronized so that individual frames of each video are identified as being taken at the same time, and then re-sorted to match a time of capture. After the video frames are synchronized and re-sorted, photogrammetric techniques are used for a time-step-based mesh construction. For example, the photogrammetric techniques extract 3D objects from a 2D frame by detecting overlapping regions in the 2D objects in different frames, by performing feature extraction by detecting features uniquely recognizable in multiple images, by triangulation via reconstruction of lines of sight from the cameras to the 2D objects resulting in a ray cloud, thus creating a mesh or a point cloud of one or more 3D objects.

In some examples, the memory experience capture system 206 includes other sensors, such as sensors 810, 812. The sensors 810, 812 may be standalone sensors or may be included, for example, in the head-wearable apparatus 116, in the mobile device 114, in the computer client device 120, and/or in the drones 118. The sensors 810, 812 may sense location, microlocation, temperature, weather conditions (e.g., via doppler radar sensors, barometric pressure sensors, anemometers, humidity sensors), lighting levels, colors, sounds, smells, tastes, humidity, and/or proximity to objects. IOT devices 814, 816 are also illustrated.

The IOT devices 814, 816 may also provide for data to be captured as part of the memory experience. For example, smart lightbulbs may provide for a level of lighting being applied, a color being used, a scene being displayed (e.g., sunset scene, reading scene, party scene). Likewise, fans, air conditioners, smart switches, smart outlets, and other IoT devices, may also have their current status of operations captured.

Biosignal sensors 818, 820 are also shown, disposed on participants 822, 824, respectively. The biosignal sensors 818, 820, include heart rate sensors, pulse oximetry sensors, eye sensors (e.g., pupil dilation sensors), electrocardiogram (ECG and/or EKG) sensors, electroencephalogram (EEG) sensors, skin galvanometers, blood pressure sensors, and so on. The biosignal sensors 818, 820 may be standalone sensors (e.g., worn by the users in a smart watch, a sports band, and the like) and/or included in the head-wearable apparatus 116, in the mobile device 114, in the computer client device 120, and/or in the drones 118.

During operations, the memory experience capture system 206 may continuously capture data of an environment, for example, by focusing on or otherwise targeting a physical location 826 using the various cameras 802, 804, 806, 808, drones 118, sensors 810, 812, 818, 820, and IOT devices 814, 816. The captured data may then be saved to a database 830, such as the database 130, via a server 832, such as the database server 128, as described earlier. For example, the captured data is stored and indexed as part of a timelapse memory experience for future use. The memory experience capture system 206 may also be used to capture data based on the user (e.g., participant 822 and/or 824) initiating a capture session. Capture sessions may also be initiated based on entering a location, based on a scheduled time, based on the user encountering certain participants, based on the user engaging in certain activities (e.g., sports activities, social activities), based on the user manually initiating a capture session, based on the appearance of certain weather conditions 834, and so on.

As mentioned above, the physical location 828 may be monitored at a first timeslot via the cameras 802, 804, 806, 808, the drones 118, the sensors 810, 812, 818, 820 to create a first portion of a timelapse memory. For example, the first portion of the timelapse memory may be captured during construction work in the morning, by visiting a park and capturing data for a few minutes, and so on. The timeslot may be any time duration, such a s a timeslot of five minutes, 1 hour, 1 day. A second timeslot is then captured after the first timeslot, and used to create a second portion of the timelapse memory. The second timeslot can have a different duration from the first timeslot. For example, the physical location 828, can be first monitored for 1 hour at day 1, then 10 minutes at day 2, then 2 hours at day 3, and so on, until a building, a home remodeling, and so on, is completed.

The resulting timelapse memory experience includes multiple portions of sensor recordings. The portions can be sequential but can also overlap. That is, the first portion may end after the second portion starts. The portions may not overlap and there can be "missing" portions. For example, the first portion can be captured at day 1 of construction with a 10 hour timeslot and the second portion may be captured at day 3 of construction with a 1 hour timeslot. Accordingly, the timelapse memory experience can have times where no data was captured.

In some embodiments, the memory experience capture system 206 uses or include the trigger system 210 to monitor data via the cameras 802, 804, 806, 808, the drones 118, the sensors 810, 812, 818, 820, and/or the IOT devices 814, 816 to trigger memory experiences. As mentioned earlier, a match is triggered by matching a single trigger data item (e.g., a picture, a video, a sound, a smell, a taste, a weather condition, a location, a microlocation, a time, a date, a lighting condition, a time, a person, a pet, a social network, and/or a biosignal) or multiple data items to with previously captured data, e.g., data stored in the database 830. Trigger data is used to create and AR and/or a VR memory experience, for example, via the AR/VR creation system 212, and to project the memory experience, for example, via the AR/VR system 212. Accordingly, the techniques described herein can use triggers both to detect a previous memory experience as well as to create AR and/or VR enhancements that may immerse the user in a more contextual manner.

Figure 9:
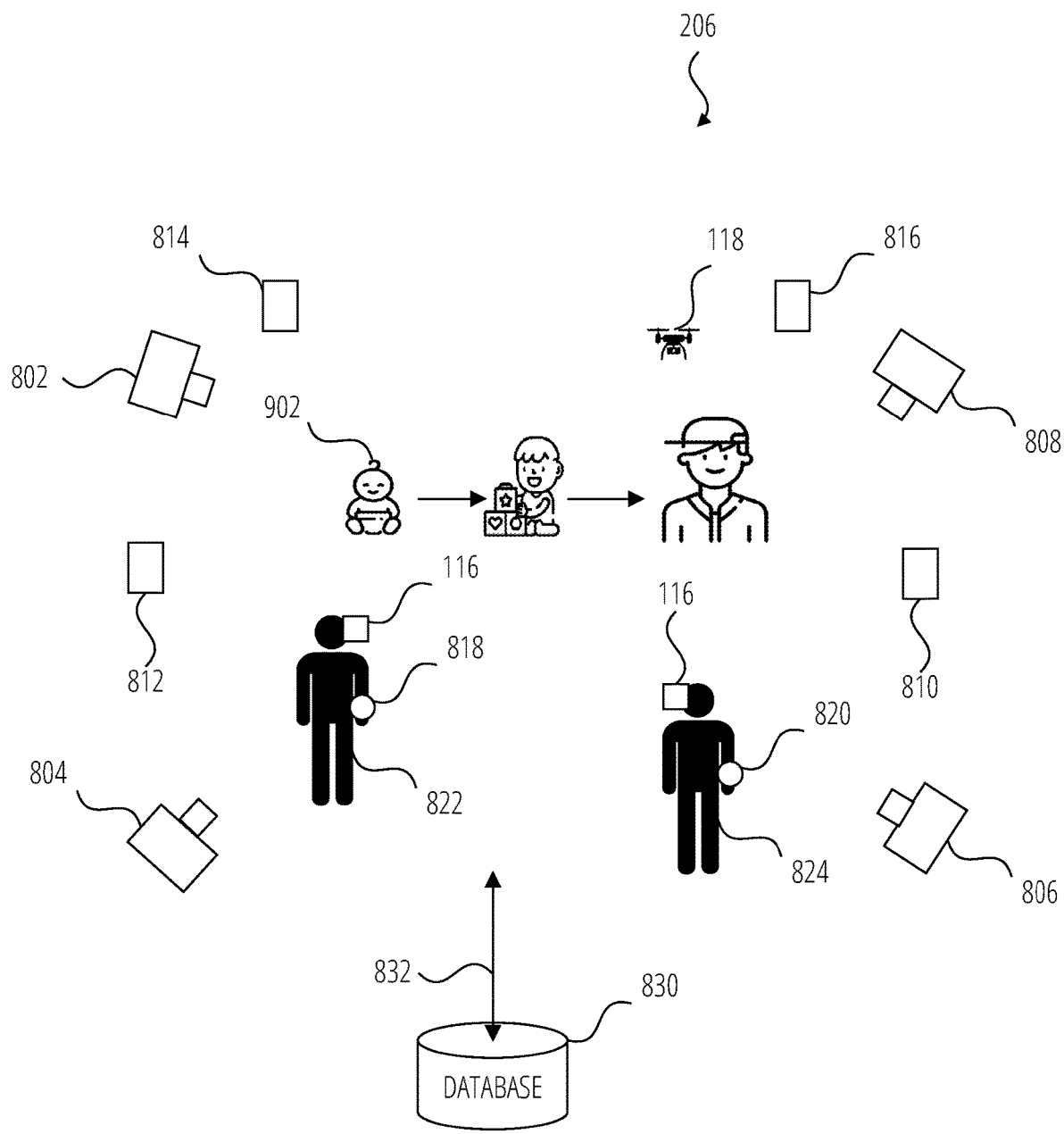
FIG. 9 illustrates another example of the memory experience capture system of FIG. 8, according to some examples.

FIG. 9 is a block diagram illustrating details of an embodiment of the memory experience capture system 206 that can be used to capture an entity 902, such as a person, a pet, and/or an object. That is, the memory experience capture system 206 is used to observe the entity 902 in addition to or alternative to observing the physical location 826 shown in FIG. 8. Accordingly, the entity 902 may be at various physical locations throughout the timelapse memory experience.

As mentioned above, the cameras 802, 804, 806, 808 and drones 118 include depth perception techniques used to determine depth and or distance to various objects. The cameras 802, 804, 806, 808 may be standalone cameras or may be included in the head-wearable apparatus 116, in the mobile device 114, and/or in the computer client device 120. During volumetric processing, the memory experience capture system 206 uses the recorded video and synchronizes a start recording time for the various recordings. The sensors 810, 812 and IOT devices 814, 816 are also illustrated, and used to capture various data. Biosignal sensors 818, 820 are also shown, disposed on participants 822, 824, respectively.

During operations, the memory experience capture system 206 may continuously capture data of an environment, for example, by focusing on the entity 902 using the various cameras 802, 804, 806, 808, drones 118, sensors 810, 812, 818, 820, and IOT devices 814, 816. The captured data may then be saved to a database 830, such as the database 130, via a server 832, such as the database server 128, as described earlier. For example, the captured data is stored and indexed as part of a timelapse memory experience for future use. The memory experience capture system 206 may also be used to capture data based on the user (e.g., participant 822 and/or 824) initiating a capture session. Capture sessions may also be initiated based on entering a location, based on a scheduled time, based on the user encountering certain participants, based on the user engaging in certain activities (e.g., sports activities, social activities), based on the user manually initiating a capture session, based on the appearance of certain weather conditions 834, and so on.

As mentioned above, the entity 902 may be monitored at a first timeslot via the cameras 802, 804, 806, 808, the drones 118, the sensors 810, 812, 818, 820 to create a first portion of a timelapse memory. For example, the first portion of the timelapse memory may be captured when the entity 902 is located inside a of first area, such as a crib, a room, a house, a building, a park, and so on. The timeslot may be any time duration, such a s a timeslot of five minutes, 1 hour, 1 day. A second timeslot is then captured after the first timeslot, and used to create a second portion of the timelapse memory. The second timeslot can be captured when the entity 902 is located inside a of second area having a different physical location from the first area. Such as a different room, inside a vehicle and so on. The second timeslot can have a different duration from the first timeslot. For example, the physical location 828, can be first monitored for 1 hour at day 1, then 10 minutes at day 2, then 2 hours at day 3, and so on, until a building, a home remodeling, and so on, is completed. The second timeslot can also be captured in the same area as the first timeslot, but at another time.

The resulting timelapse memory experience includes multiple portions of sensor recordings. The portions can be sequential but can also overlap. That is, the first portion may end after the second portion starts. The portions may not overlap and there can be "missing" portions. For example, the first portion can be captured at day 1 of construction with a 10 hour timeslot and the second portion may be captured at day 3 of construction with a 1 hour timeslot. Accordingly, the timelapse memory experience can have times where no data was captured. The resulting timelapse memory experience can then capture the entity 902, e.g., a baby, as the baby grows and becomes a teenager through various physical locations. Likewise, if the entity 902 is an object such as a car, the timelapse memory can capture the car being remodeled. Similarly, if the entity 902 is a puppy, the timelapse memory can capture the puppy growing into an adult dog. In this manner, the techniques described herein can capture a variety of timelapse subjects (e.g., physical locations, entities, or combinations thereof) and provide for a more immersive presentation through various times.

Machine Architecture

Figure 10:
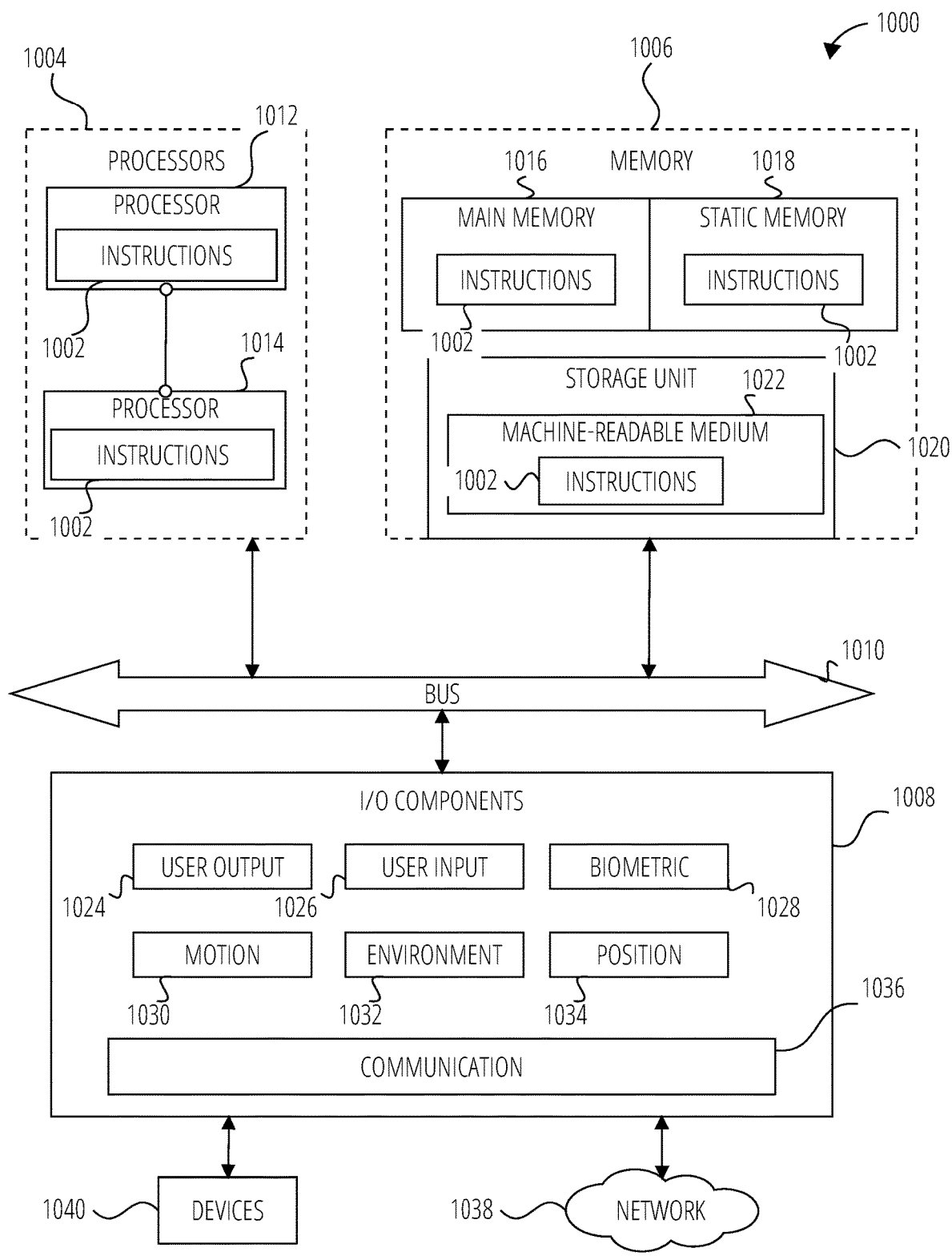
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system including, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example. The position components 1034 include location sensor components (e.g., a GPS receiver component), altitude sensor components (e.g., altimeters or barometers that detect air pressure from which altitude may be derived), orientation sensor components (e.g., magnetometers), and the like. It is to be noted that the I/O components may also include the cameras 802, 804, 806, 808, the sensors, 810, 812, 818, 820, and I/O included in the drones 118.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a universal serial bus (USB) port), IoT devices, and the like.

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
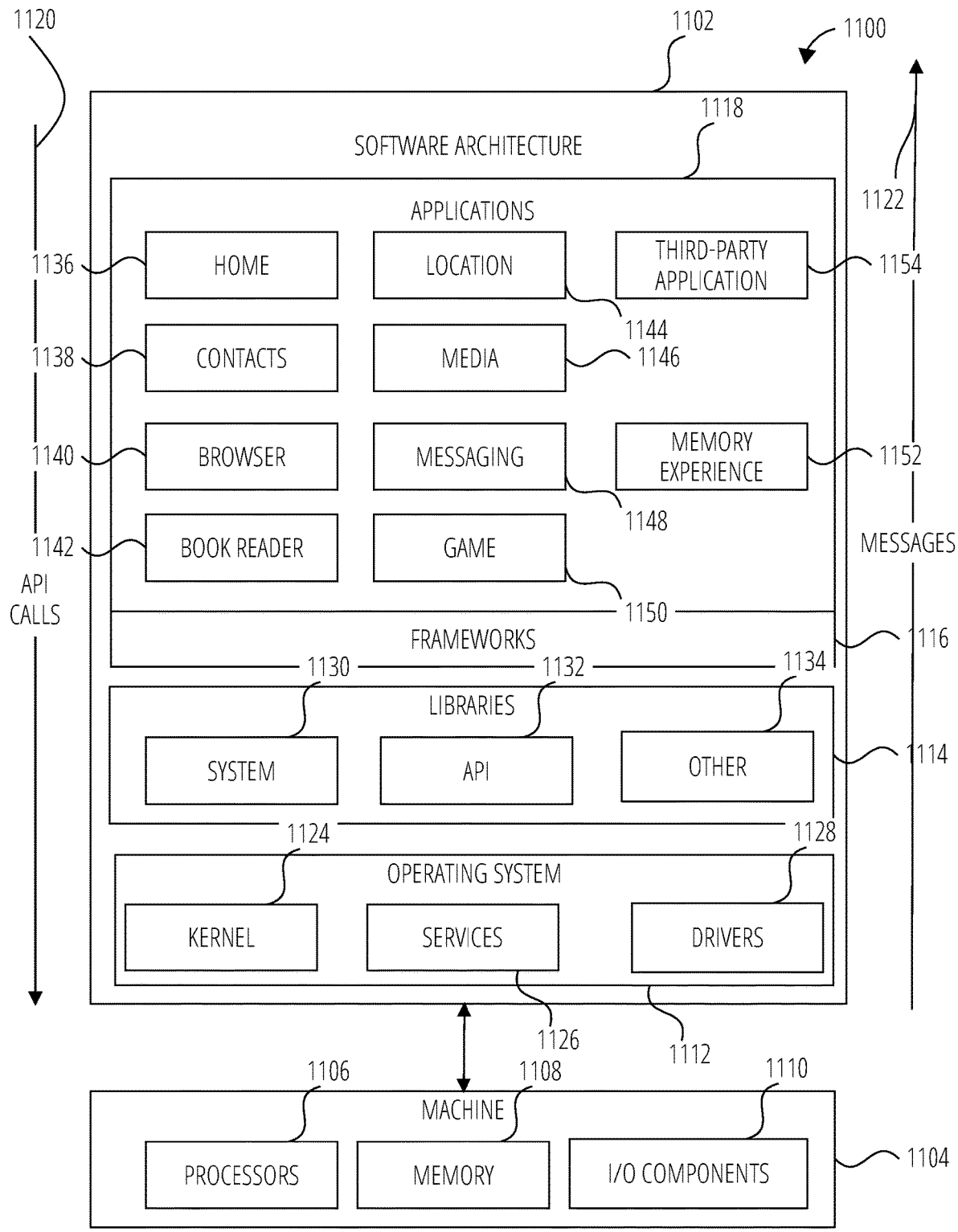
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, a memory experience application 1152, and a broad assortment of other applications such as a third-party application 1154. The memory experience application 1152 may provide for functionality such capturing and storing a memory experience as described with respect to process 600 of FIG. 6. Likewise, the memory experience application 1152 may provide for functionality for creating and displaying AR and/or VR content for memory experience presentations, as described with respect to process 700 of FIG. 7.

The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1154 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1154 can invoke the API calls 1120 provided by the operating system 1112 to facilitate functionalities described herein.

CONCLUSION

Technical effects include capturing timelapse memory experience data via various types of sensors, and storing the captured data as a timelapse memory experience. Various memory experience triggers are then used to both detect that a timelapse memory experience has previously occurred as well as to create an augmented reality (AR) and/or a virtual reality (VR) memory experience. 3D volumetric video can be used as part of the AR and/or the VR memory experience. The AR and/or VR experience may additionally involve communication with internet-of-things (IoT) devices that are then used to mimic the originally captured memory experience. The timelapse memory experience can capture timeslots at different portions of the timeline memory experience, and focusing on desired physical locations, entities (e.g., people, objects, pets), or a combination thereof.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, personal digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    capturing, via one or more sensors of a computing device, data of an environment observed by the one or more sensors at a first timeslot;
    storing the data in a data store as a first portion of a timelapse memory experience;
    capturing, via the one or more sensors of the computing device, data of the environment observed by the one or more sensors at a second timeslot;
    storing the data in a data store as a second portion of the timelapse memory experience;
    associating the timelapse memory experience with a memory experience trigger, wherein the memory experience trigger is configured to initiate a presentation of the timelapse memory experience ;
    identifying one or more participants captured in at least one of the first portion or second portion of the timelapse memory experience;
    presenting, via a respective computing device associated with each of the one or more participants, the timelapse memory experience to the one or more participants; and
    recording interactions of the one or more participants with the timelapse memory experience.

2. The method of claim 1, wherein the environment comprises a physical location and wherein the one or more sensors observe the physical location during the capturing at the first timeslot and during the capturing at the second timeslot.

3. The method of claim 1, wherein the environment comprises an entity located inside of a first area, and wherein the one or more sensors observe the entity, a portion of the first area, or a combination thereof, during the capturing at the first timeslot.

4. The method of claim 3, wherein the entity comprises a person, a pet, an object, or a combination thereof.

5. The method of claim 3, wherein the environment comprises the entity located inside of a second area having a different physical location from the first area, and wherein the one or more sensors observe the entity, a portion of the second area, or a combination thereof, during the capturing at the second timeslot.

6. The method of claim 1, further comprising:
    monitoring the environment via the one or more sensors of the computing device;
    applying the memory experience trigger to detect that the timelapse memory experience is stored in the data store based on the monitoring;
    creating, based on the timelapse memory experience, an augmented reality memory experience, a virtual reality memory experience, or a combination thereof; and
    presenting the augmented reality memory experience, the virtual reality memory experience, or the combination thereof via the computing device.

7. The method of claim 6, wherein creating the augmented reality memory experience, the virtual reality memory experience, or the combination thereof, comprises transforming the timelapse memory experience into an augmented reality augmentation, a virtual reality augmentation, an avatar, an augmented reality object, a virtual reality object, a smell signal transmissible to a scent presentation device, a taste signal transmissible to a tasting device, a haptic force, an internet-of-things (IoT) device command, or a combination thereof.

8. The method of claim 7, wherein the augmented reality augmentation, the virtual reality augmentation, or the combination thereof, comprises a three-dimensional volumetric video configured to enable a user of the computing device to view the three-dimensional volumetric video at a plurality of viewpoint depths.

9. The method of claim 6, wherein applying the memory experience trigger to detect that the timelapse memory experience is stored comprises comparing a trigger data associated with the memory experience trigger against a memory experience data associated with the timelapse memory experience to determine that a match exists.

10. The method of claim 9, wherein the trigger data comprises a location, a microlocation, at least one participant of the timelapse memory experience, a picture, a video, a sound, a biosignal, a smell signal, a taste signal, a weather condition, a lighting condition, a time, a date, a person, a pet, or a combination thereof.

11. The method of claim 1, wherein the one or more sensors are disposed in a head-wearable apparatus, in a drone, in a mobile device, in a portable computing device, or a combination thereof.

12. The method of claim 1, wherein the one or more sensors comprise a sound sensor, a camera sensor, a weather sensor, a light condition sensor, a location sensor, a microlocation sensor, a smell sensor, a taste sensor, a biosignal sensor, or a combination thereof.

13. A system, comprising:
one or more hardware processors; and
at least one memory storing instructions that cause the one or more hardware processors to perform operations comprising:
capturing, via one or more sensors of a computing device, data of an environment observed by the one or more sensors at a first timeslot;
storing the data in a data store as a first portion of a timelapse memory experience;
capturing, via the one or more sensors of a computing device, data of the environment observed by the one or more sensors at a second timeslot;
storing the data in a data store as a second portion of the timelapse memory experience;
associating the timelapse memory experience with a memory experience trigger, wherein the memory experience trigger is configured to initiate a presentation of the timelapse memory experience ;
identifying one or more participants captured in at least one of the first portion or second portion of the timelapse memory experience;
presenting, via a respective computing device associated with each of the one or more participants, the timelapse memory experience to the one or more participants; and
recording interactions of the one or more participants with the timelapse memory experience.

14. The system of claim 13, wherein the environment comprises a physical location and wherein the one or more sensors observe the physical location during the capturing at the first timeslot and during the capturing at the second timeslot or the environment comprises an entity located inside of a first area, and wherein the one or more sensors observe the entity, a portion of the first area, or a combination thereof, during the capturing at the first timeslot.

15. The system of claim 13, the operations further comprising:
monitoring the environment via the one or more sensors of the computing device;
applying the memory experience trigger to detect that the timelapse memory experience is stored in the data store based on the monitoring;
creating, based on the timelapse memory experience, an augmented reality memory experience, a virtual reality memory experience, or a combination thereof; and
presenting the augmented reality memory experience, the virtual reality memory experience, or the combination thereof via the computing device.

16. The system of claim 15, wherein creating the augmented reality memory experience, the virtual reality memory experience, or the combination thereof, comprises transforming the timelapse memory experience into an augmented reality augmentation, a virtual reality augmentation, an avatar, an augmented reality object, a virtual reality object, a smell signal transmissible to a scent presentation device, a taste signal transmissible to a tasting device, a haptic force, an internet-of-things (IoT) device command, or a combination thereof.

17. The system of claim 16, wherein the augmented reality augmentation, the virtual reality augmentation, or the combination thereof, comprises a three-dimensional volumetric video configured to enable a user of the computing device to view the three-dimensional volumetric video at a plurality of viewpoint depths.

18. A non-transitory machine-readable medium storing instructions that, when executed by a computer system, cause the computer system to perform operations comprising:
capturing, via one or more sensors of a computing device, data of an environment observed by the one or more sensors at a first timeslot;
storing the data in a data store as a first portion of a timelapse memory experience;
capturing, via the one or more sensors of a computing device, data of the environment observed by the one or more sensors at a second timeslot;
storing the data in a data store as a second portion of the timelapse memory experience;
associating the timelapse memory experience with a memory experience trigger, wherein the memory experience trigger is configured to initiate a presentation of the timelapse memory experience ;
identifying one or more participants captured in at least one of the first portion or second portion of the timelapse memory experience;
presenting, via a respective computing device associated with each of the one or more participants, the timelapse memory experience to the one or more participants; and
recording interactions of the one or more participants with the timelapse memory experience.

19. The non-transitory machine-readable medium of claim 18, the operations further comprising:
monitoring the environment via the one or more sensors of the computing device;
applying the memory experience trigger to detect that the timelapse memory experience is stored in the data store based on the monitoring;
creating, based on the timelapse memory experience, an augmented reality memory experience, a virtual reality memory experience, or a combination thereof; and
presenting the augmented reality memory experience, the virtual reality memory experience, or the combination thereof via the computing device.

20. The method of claim 1, wherein recording user interactions comprises recording at least one of: audio comments, visual annotations, or reactions added by the one or more participants during presentation of the timelapse memory experience.

* * * * *